(12) United States Patent
Chen

(10) Patent No.: US 11,496,958 B2
(45) Date of Patent: Nov. 8, 2022

(54) PUBLIC LAND MOBILE NETWORK SELECTION BY USER EQUIPMENT IN AN INACTIVE MODE AT A RADIO RESOURCE CONTROL LAYER

(71) Applicant: Google LLC, Mountain View, CA (US)

(72) Inventor: Teming Chen, Taipei (TW)

(73) Assignee: Google LLC, Mountain View, CA (US)

( * ) Notice: Subject to any disclaimer, the term of this patent is extended or adjusted under 35 U.S.C. 154(b) by 91 days.

(21) Appl. No.: 17/265,123

(22) PCT Filed: Aug. 8, 2019

(86) PCT No.: PCT/US2019/045820
§ 371 (c)(1),
(2) Date: Feb. 1, 2021

(87) PCT Pub. No.: WO2020/033780
PCT Pub. Date: Feb. 13, 2020

(65) Prior Publication Data
US 2021/0314860 A1    Oct. 7, 2021

Related U.S. Application Data

(60) Provisional application No. 62/716,091, filed on Aug. 8, 2018.

(51) Int. Cl.
*H04W 48/18* (2009.01)
*H04W 76/10* (2018.01)
(Continued)

(52) U.S. Cl.
CPC .......... *H04W 48/18* (2013.01); *H04W 36/08* (2013.01); *H04W 52/0209* (2013.01); *H04W 76/10* (2018.02)

(58) Field of Classification Search
CPC ..... H04W 76/27; H04W 60/00; H04W 60/04; H04W 68/005; H04W 68/02; H04W 8/08;
(Continued)

(56) References Cited

U.S. PATENT DOCUMENTS 8,260,291 B2   9/2012 Wu
9,432,891 B2   8/2016 Lim et al.
(Continued)

FOREIGN PATENT DOCUMENTS

CN    106658758    5/2017
WO    2018008944    1/2018
(Continued)

OTHER PUBLICATIONS

"3GPP TS 38.304 V15.0.0", 3GPP TS 38.304 V15.0.0, Jun. 2018, Jun. 2018, 25 pages.
(Continued)

*Primary Examiner* — Matthew C Sams
(74) *Attorney, Agent, or Firm* — Colby Nipper PLLC

(57) ABSTRACT

This document describes techniques and apparatuses for handling Public Land Mobile Network (PLMN) selection while user equipment is in an inactive mode at a radio resource control layer. In aspects, the UE performs a cell-selection procedure that selects a first cell that serves a first Public Land Mobile Network (PLMN). The UE establishes a radio connection to the first PLMN. The UE transitions from a connected mode at a radio resource control layer to an inactive mode at a radio resource control layer. After a period of time, the UE performs a cell-reselection procedure that selects a second cell that serves a second PLMN. The UE determines if the second PLMN is an equivalent PLMN to the first PLMN. If the second PLMN is an equivalent PLMN to the first PLMN, the UE sends an indication to a lower layer that triggers an action.

20 Claims, 6 Drawing Sheets

(51) Int. Cl.
  *H04W 36/08* (2009.01)
  *H04W 52/02* (2009.01)
(58) Field of Classification Search
  CPC ............. H04W 12/0433; H04W 24/02; H04W
    36/0033; H04W 48/16; H04W 48/18;
    H04W 52/0229; H04W 60/06; H04W
    76/10; H04W 76/25; H04W 76/30; H04W
    76/32; H04W 80/10; H04W 36/08; H04W
    52/0209
  See application file for complete search history.

(56) References Cited

U.S. PATENT DOCUMENTS

| | | | |
|---|---|---|---|
| 9,743,453 | B2 | 8/2017 | Kim et al. |
| 10,218,422 | B2 | 2/2019 | Raghavan et al. |
| 11,212,864 | B2 * | 12/2021 | Wang ................. H04W 60/04 |
| 2011/0158117 | A1 | 6/2011 | Ho et al. |
| 2014/0099912 | A1 | 4/2014 | Lee et al. |
| 2015/0195795 | A1 | 7/2015 | Loehr et al. |
| 2016/0323832 | A1 | 11/2016 | Love et al. |
| 2017/0223618 | A1 | 8/2017 | Liu |
| 2018/0007622 | A1 | 1/2018 | Kim et al. |
| 2018/0139778 | A1 | 5/2018 | Chou et al. |
| 2018/0234894 | A1 * | 8/2018 | Jiang ................. H04W 76/27 |
| 2019/0081657 | A1 | 3/2019 | Zeng et al. |
| 2019/0191483 | A1 * | 6/2019 | Ryoo ................ H04W 12/0433 |
| 2019/0373441 | A1 * | 12/2019 | Ryu ..................... H04W 48/18 |
| 2020/0154442 | A1 | 5/2020 | Zhou |

FOREIGN PATENT DOCUMENTS

| | | |
|---|---|---|
| WO | 2018128018 | 7/2018 |
| WO | 2018130115 | 7/2018 |
| WO | 2020033780 | 2/2020 |

OTHER PUBLICATIONS

"5G; Non-Access-Stratum (NAS) protocol for 5G System (5GS); Stage 3", 3GPP TS 24.501 version 15.0.0 Release 15, Jul. 2018, 337 pages.
"Email Discussion Report on RRC Connection Control", 3GPP TSG RAN WG2 Meeting Ad-hoc R2-17, 55 pages.
"International Preliminary Report on Patentability", PCT Application No. PCT/US2019/045820, dated Nov. 9, 2020, 19 pages.
"International Search Report and Written Opinion", PCT Application No. PCT/US2019/045820, dated Oct. 31, 2019, 44 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.
"NR RRC State Transitions to get in IDLE and INACTIVE", 3GPP TSG RAN WG2 Meeting #98, Hangzhou, China, May 15-19, 2017, 4 pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"Written Opinion", PCT Application No. PCT/US2019/045820, dated Jun. 29, 2020, 5 pages.
Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Wu, "Handling Overheating in a Wireless-Communication Device", Technical Disclosure Commons; Retrieved from https://www.tdcommons.org/dpubs_series/2343, Jul. 12, 2019, 22 pages.
"Foreign Office Action", IN Application No. 202147008904, dated Jan. 24, 2022, 7 pages.

* cited by examiner

PUBLIC LAND MOBILE NETWORK SELECTION BY USER EQUIPMENT IN AN INACTIVE MODE AT A RADIO RESOURCE CONTROL LAYER

RELATED APPLICATION(S)

This application is a national stage entry of International Application No. PCT/US2019/045820, filed Aug. 8, 2019, which claims the benefit of U.S. Provisional Application No. 62/716,091, filed Aug. 8, 2018, the disclosures which are incorporated herein by reference in their entirety.

BACKGROUND

The evolution of wireless communication to Fifth Generation (5G) standards and technologies provides higher data rates and greater capacity, with improved reliability and lower latency, which enhances mobile broadband services. 5G technologies also provide new classes of services for vehicular, fixed wireless broadband, and the Internet of Things (IoT).

A core network operator provides its telecommunication services to user equipment (UE) through a network. One example of a network is a Public Land Mobile Network (PLMN) that includes the core network and one or more base stations, which collectively form a Radio Access Network (RAN) connected to the network. To communicate wirelessly with the network, a UE may establish a connection to the network via a cell (e.g., a base station, a serving cell).

After establishing the connection, the UE may transition between different resource control states (e.g., RRC connected state, RRC inactive state, RRC idle state) at a radio resource control (RRC) layer. For example, the UE may transition from an RRC connected state (e.g., RRC_CONNECTED) to an RRC inactive state (e.g., RRC_INACTIVE) at the RRC layer. A UE can be in an RRC inactive state when: (1) the UE is in 5GMM-CONNECTED mode with RRC inactive indication at the Non-Access Stratum layer (NAS layer) (e.g., the UE is in 5GMM-CONNECTED mode over 3GPP access at the NAS layer and the UE is in the RRC_INACTIVE state at the Access Stratum (AS) layer), or (2) the UE is in RRC_INACTIVE at the RRC layer.

When a UE is switched on, the NAS layer may select a PLMN. With cell selection, the UE searches for a suitable cell of the selected PLMN, chooses that cell to provide available services, and monitors its control channel (aka "camps on the cell"). The UE, if necessary, then registers its presence, utilizing a NAS registration procedure, in the tracking area of the chosen cell of the selected PLMN. As an outcome of successful location registration, the selected PLMN then becomes a "registered" PLMN. After selection to the registered PLMN, the NAS of the UE may select a more-suitable cell, according to the cell reselection criteria, and camp on it. The new cell may belong to a new PLMN that is not an equivalent PLMN to the registered PLMN.

If the UE selects a new PLMN that is not an equivalent PLMN to the registered PLMN, the UE triggers a transition from an inactive state (e.g., 5GMM-CONNECTED mode with RRC inactive indication) to an idle state (e.g., 5GMM-IDLE mode). In such an instance, the upper layers (e.g., the NAS layer) of the UE enter the idle mode (e.g., 5GMM-IDLE) and the lower layer (e.g., RRC layer) remains in the inactive mode (e.g., RRC_INACTIVE). The lower layer does not know that the upper layer(s) have already left the inactive mode.

As a result, there is a state mismatch between at least one upper layer (e.g., NAS layer, 5GMM layer) and at least one lower layer (e.g., Access Stratum (AS) layer, RRC layer). Due to the state mismatch between an upper layer and a lower layer, a situation may arise where the NAS layer may request the RRC layer to establish an RRC connection while the RRC layer is in an inactive state. When the RRC layer is in an inactive state, it cannot establish an RRC connection. According to the current 3GPP specification, the RRC layer ignores this request from the upper layer (e.g., the NAS layer, the 5GMM layer). Furthermore, due to the state mismatch, the RRC layer may perform an unnecessary radio access network-based (RAN-based) notification area (RNA) update procedure and waste its power while in the radio resource control (RRC) inactive mode; because the NAS layer is already in idle mode, the RNA update is not needed.

SUMMARY

Techniques and apparatuses are described for handling Public Land Mobile Network (PLMN) selection while the user equipment (UE) is in a radio resource inactive mode (an inactive mode at a radio resource control layer). In particular, a resource control module controls the upper and lower layers to increase connection efficiency and to preserve a UE's power while it is in inactive mode at a radio resource control layer.

These techniques and apparatuses decrease the number of unnecessary radio access network-based (RAN-based) notification area (RNA) update procedures, thereby increasing the battery life of the UE and freeing up network resources.

Aspects described below include an apparatus having a resource control module. The resource control module is configured to perform a cell-selection procedure that selects a first cell (e.g., provided by a first base station), determine that the first cell serves a first PLMN, establish a radio connection to a first Public Land Mobile Network (PLMN) via the first cell, determine that the apparatus has transitioned to a radio resource inactive mode, perform a cell-reselection procedure that selects a second cell (e.g., provided by a different base station), determine that the second cell serves a second PLMN, determine that the second PLMN is not an equivalent PLMN to the first PLMN, establish a radio connection to a second Public Land Mobile Network (PLMN) via the second cell, transition the upper layer to an idle mode (e.g., 5GMM-IDLE), and send an indication to a lower layer that triggers an action by the lower layer.

Aspects described below also include an apparatus having a resource control module. The resource control module is configured to perform a cell-selection procedure that selects a first cell, determine that the first cell serves a first PLMN, establish a radio connection to a first Public Land Mobile Network (PLMN) via the first cell, determine that the apparatus has transitioned to a radio resource inactive mode, perform a cell-reselection procedure that selects a second cell, determine that the second cell serves a second PLMN, determine that the second PLMN is an equivalent PLMN to the first PLMN, establish a radio connection to a second Public Land Mobile Network (PLMN) via the second cell, transition the upper layer to an upper layer idle mode, and send an indication to a lower layer that triggers an action by the lower layer.

Aspects described below also include an apparatus having a resource control module. The resource control module is configured to determine that a lower layer is in a radio resource inactive mode, receive a Radio Resource Control (RRC) connection establishment request from an upper layer, and perform an RRC connection establishment procedure.

Aspects described below also include one or more computer-readable storage media storing executable instructions, that, responsive to execution by a processor, implement a resource control module. The resource control module is configured to perform a cell-selection procedure that selects a first cell, determine that the first cell serves a first PLMN, establish a radio connection to a first Public Land Mobile Network (PLMN) via the first cell, determine that the apparatus has transitioned to a radio resource inactive mode, perform a cell-reselection procedure that selects a second cell, determine that the second cell serves a second PLMN, determine that the second PLMN is not an equivalent PLMN to the first PLMN, establish a radio connection to a second Public Land Mobile Network (PLMN) via the second cell, transition the upper layer to an idle mode (e.g., 5GMM-IDLE), and send an indication to a lower layer that triggers an action by the lower layer.

Aspects described below also include one or more computer-readable storage media storing executable instructions, that, responsive to execution by a processor, implement a resource control module. The resource control module is configured to perform a cell-selection procedure that selects a first cell, determine that the first cell serves a first PLMN, establish a radio connection to a first Public Land Mobile Network (PLMN) via the first cell, determine that the apparatus has transitioned to a radio resource inactive mode, perform a cell-reselection procedure that selects a second cell, determine that the second cell serves a second PLMN, determine that the second PLMN is an equivalent PLMN to the first PLMN, establish a radio connection to a second Public Land Mobile Network (PLMN) via the second cell, transition the upper layer to an idle mode (e.g., 5GMM-IDLE), and send an indication to a lower layer that triggers an action by the lower layer.

Aspects described below also include one or more computer-readable storage media storing executable instructions, that, responsive to execution by a processor, implement a resource control module. The resource control module is configured to determine that a lower layer is in a radio resource inactive mode, receive a Radio Resource Control (RRC) connection establishment request from an upper layer, and perform an RRC connection establishment procedure.

Aspects described below also include a method performed by a UE, comprising performing a cell-selection procedure that selects a first cell, determining that the first cell serves a first PLMN, establishing a radio connection to a first Public Land Mobile Network (PLMN) via the first cell, determining that a lower layer of the UE has transitioned to an radio resource inactive mode, performing a cell-reselection procedure that selects a second cell, determining that the second cell serves a second PLMN, determining whether the second PLMN is an equivalent PLMN to the first PLMN, establishing a radio connection to a second Public Land Mobile Network (PLMN) via the second cell, transitioning the upper layer to an idle mode (e.g., 5GMM-IDLE), and sending an indication to a lower layer that triggers an action by the lower layer.

Aspects described below also include a system comprising means for performing a cell-selection procedure that selects a first cell, means for determining that the first cell serves a first PLMN, means for establishing a radio connection to a first Public Land Mobile Network (PLMN) via the first cell, means for determining the apparatus has transitioned to a radio resource inactive mode, means for performing a cell-reselection procedure that selects a second cell, means for determining that the second cell serves a second PLMN, means for determining if the second PLMN is or is not an equivalent PLMN to the first PLMN, means for establishing a radio connection to a second Public Land Mobile Network (PLMN) via the second cell, means for transitioning the upper layer to an idle mode (e.g., 5GMM-IDLE), and means for sending an indication to a lower layer that triggers an action by the lower layer.

Aspects described below also include a system comprising means for determining that a lower layer is in a radio resource inactive mode, means for receiving a Radio Resource Control (RRC) connection establishment request from an upper layer, and means for performing an RRC connection establishment procedure.

BRIEF DESCRIPTION OF THE DRAWINGS

Apparatuses for and techniques of handling Public Land Mobile Network (PLMN) selection while a user equipment (UE) is in an inactive mode at a radio resource control layer are described with reference to the following drawings. The same numbers are used throughout the drawings to reference like features and components.

DETAILED DESCRIPTION

Overview

This document describes techniques and apparatuses for handling Public Land Mobile Network (PLMN) selection while user equipment (UE) is in an inactive mode at a radio resource control layer. These techniques and devices are designed to improve communication performance by tailoring the handling of PLMN selection in a UE or a group of UEs. These customizations decrease power usage for a UE, increase connection efficiency, and conserve network resources.

These techniques and apparatuses decrease the number of radio access network-based (RAN-based) notification area (RNA) update procedures, thereby increasing the battery life of the UE and freeing up network resources. While features and concepts of the described systems and methods for the handling PLMN selection while a UE is in an inactive mode at a radio resource control layer can be implemented in any number of different environments, systems, devices, and/or various configurations, aspects of handling PLMN selection while a UE is in an inactive mode at a radio resource control layer are described in the context of the following example devices, systems, and configurations.

Example Environment

Figure 1:
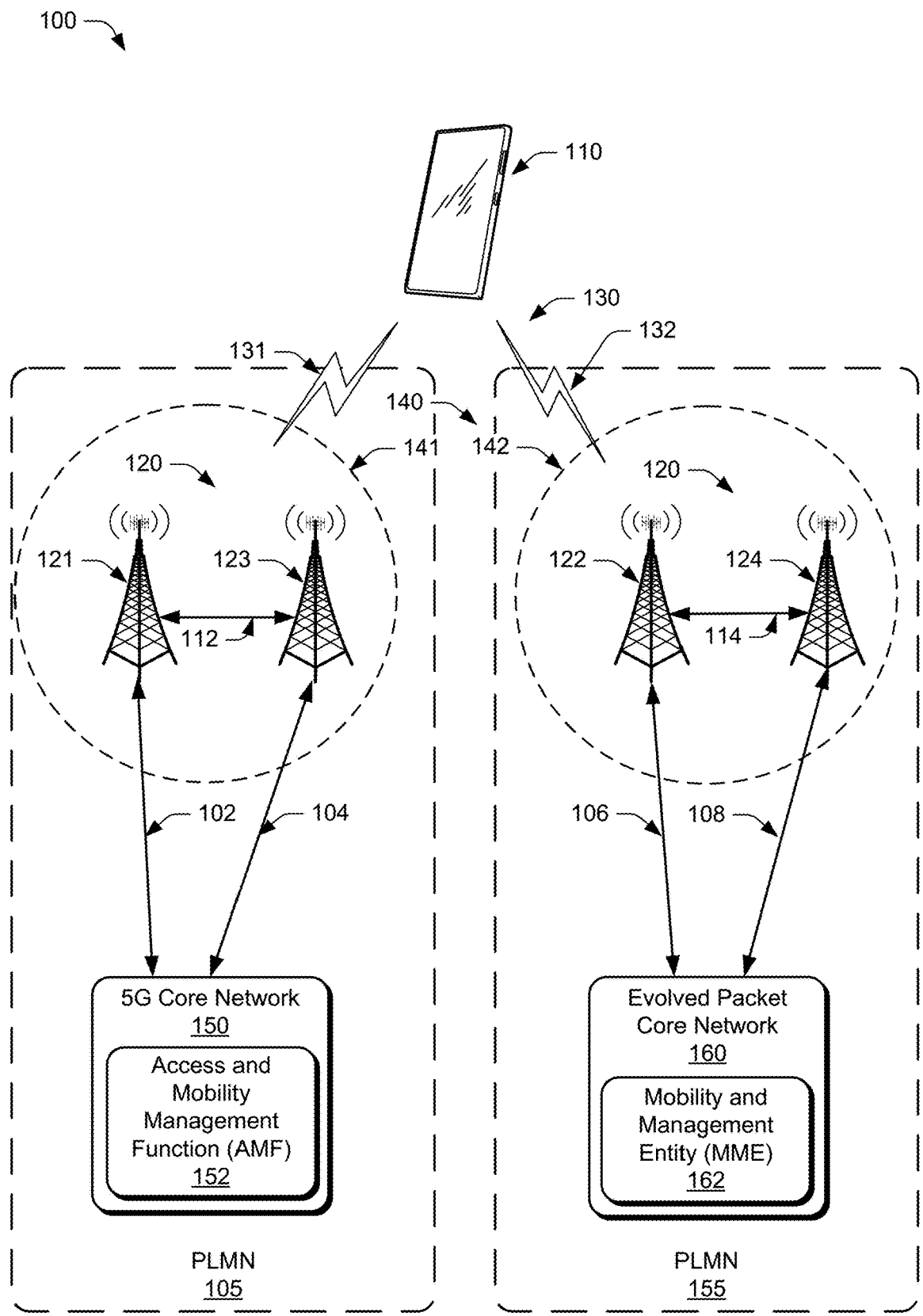
FIG. 1 illustrates an example wireless network environment in which various aspects of handling PLMN selection while a UE is in an inactive mode at a radio resource control layer can be implemented.

FIG. 1 is an illustration of an example wireless network environment in which various aspects of handling Public Land Mobile Network (PLMN) selection while user equipment (UE) is in an inactive mode at a radio resource control layer may be embodied. In the example environment 100, user equipment 110 (UE 110) communicates with one or more base stations 120 (illustrated as base stations 121, 122, 123, and 124) through one or more wireless communication links 130 (wireless link 130), illustrated as wireless links 131 and 132. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 via the wireless links 131 and 132, which may be implemented as any suitable type of wireless link. The wireless link 131 and 132 can include a downlink of data and control information communicated from the base stations 120 to the UE 110, an uplink of other data and control information communicated from the UE 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

In this example, the base stations 120 are illustrated as a tower of a cellular network. However, the base station 120 may represent or be implemented as another device, radio access node, wireless communication node, or another suitable piece of equipment that facilitates wireless communication (via a wireless link) between user equipment and a communication network, such as a NodeB base station, a Next Generation Base NodeB (gNB) base station, an Enhanced NodeB (eNB) base station, an evolved NodeB (eNodeB) base station, a Global System for Mobile Communication (GSM) base station, a code-division multiple-access (CDMA) base station, a base transceiver system, a Wireless Local Access Network (WLAN) router, a satellite, a terrestrial television broadcast tower, an access point, a peer-to-peer device, another smartphone acting as a base station, and so forth.

The base stations 120 are collectively a Radio Access Network 140 (RAN 140). The RANs 140 are illustrated as an NR RAN 141 (RAN 141) and an E-UTRAN 142 (RAN 142). The base stations 121 and 123 in the NR RAN 141 are connected to a Fifth Generation Core 150 (5GC 150) network and form a first PLMN 105. The base stations 122 and 124 in the E-UTRAN 142 are connected to an Evolved Packet Core 160 (EPC 160) and form a second PLMN 155. While FIG. 1 illustrates RAN 141 as an NR RAN and RAN 142 as an E-UTRAN, either RAN 141 could be any form of a Radio Access Network (e.g., RAN, Evolved Universal Terrestrial Radio Access Network, E-UTRAN, Next Generation Radio Access Network (NG-RAN), 5G NR RAN, NR RAN). Although FIG. 1 illustrates the PLMN 105 as a 5G core network and PLMN 155 as an Evolved Packet core network (EPC), either PLMN could include a 5G core network 150 and/or an EPC 160.

The base stations 121 and 123 connect, at 102 and 104 respectively, to the 5GC 150 via an NG2 interface for control-plane signaling and via an NG3 interface for user-plane data communications. The base stations 122 and 124 connect, at 106 and 108 respectively, to the EPC 160 via an S1 interface for control-plane signaling and user-plane data communications.

In addition to connections to core networks, base stations 120 may communicate with each other. The base stations 121 and 123 communicate via an Xn interface at 112. The base stations 122 and 124 communicate via an X2 interface at 114.

The 5GC 150 includes an Access and Mobility Management Function 152 (AMF 152) that provides control-plane functions such as registration and authentication of multiple UE 110, authorization, mobility management, or the like in the 5G NR network. The EPC 160 includes a Mobility and Management Entity 162 (MME 162) that provides control-plane functions such as registration and authentication of multiple UE 110, authorization, mobility management, or the like in the E-UTRA network. The AMF 152 and the MME 162 communicate with the base stations 120 in the RANs 140, and also communicate with multiple UE 110, via the base stations 120.

Example Devices

Figure 2:
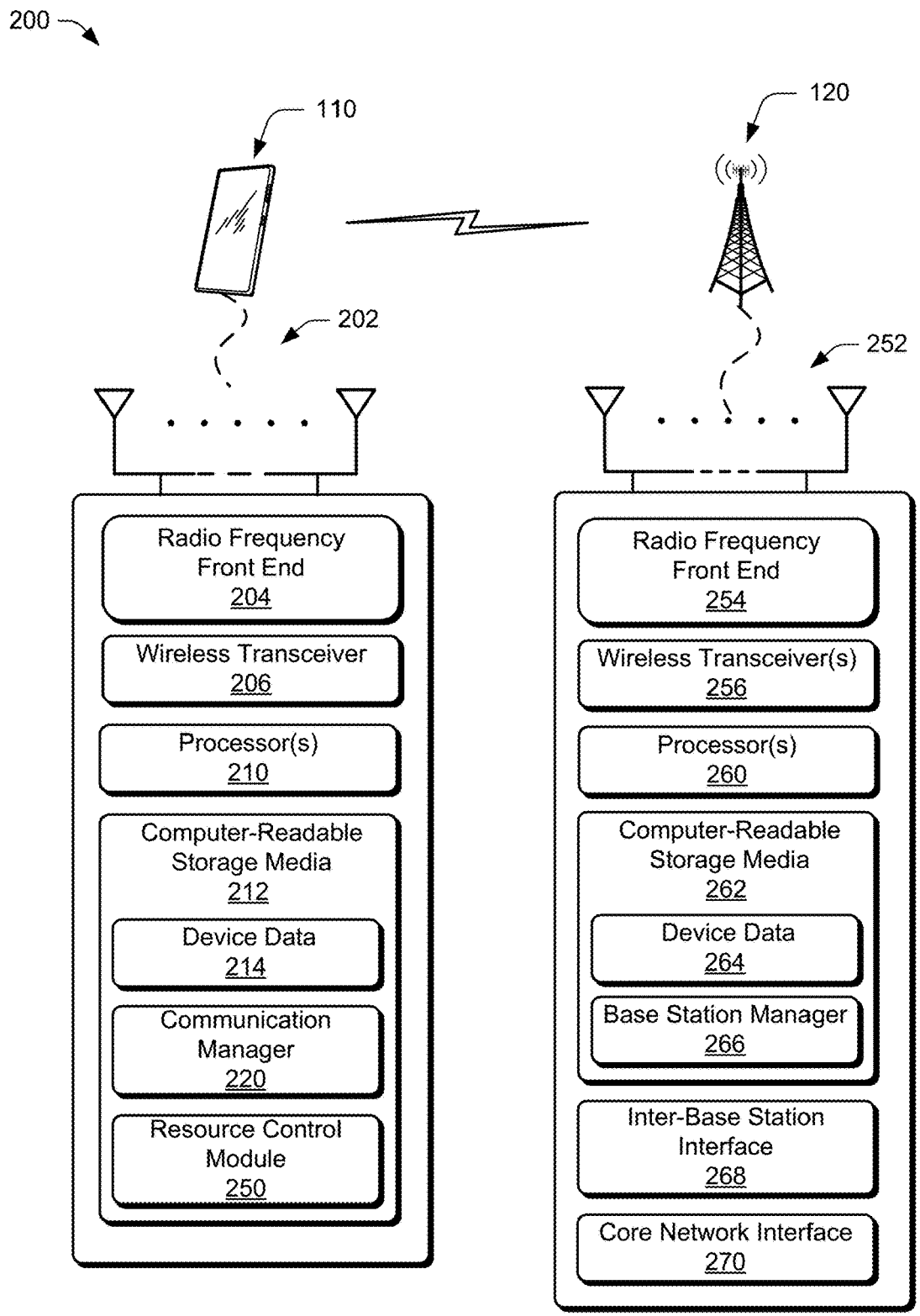
FIG. 2 illustrates an example device diagram for devices that can implement various aspects of handling PLMN selection while a UE is in an inactive mode at a radio resource control layer can be implemented.

FIG. 2 illustrates example device diagrams 200 of the UE 110 and the base stations 120. The UE 110 and the base stations 120 may include additional functions and interfaces that are omitted from FIG. 2 for the sake of clarity.

The UE 110 includes antennas 202, a radio frequency front end 204 (RF front end 204), and one or more wireless transceiver(s) 206 for communicating with base stations 120 in the 5G RAN 141 and/or the E-UTRAN 142. The RF front end 204 of the UE 110 can couple or connect the wireless transceiver(s) 206 to the antennas 202 to facilitate various types of wireless communication. The antennas 202 of the UE 110 may include an array of multiple antennas that are configured similar to or different from each other. The antennas 202 and the RF front end 204 can be tuned to, and/or be tunable to, one or more frequency bands defined by the 3GPP LTE and 5G NR communication standards and implemented by the wireless transceiver(s) 206. Additionally, the antennas 202, the RF front end 204, the wireless transceiver(s) 206 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

The UE 110 also includes processor(s) 210 and computer-readable storage media 212 (CRM 212). The processor 210 may be a single-core processor or a multiple-core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by the processor(s) 210 to enable user-plane communication, control-plane signaling, and user interaction with the UE 110.

CRM 212 also includes a communication manager 220. Alternatively or additionally, the communication manager 220 may be implemented in whole or part as hardware logic or circuitry integrated with or separate from other components of the UE 110. In at least some aspects, the communication manager 220 configures the RF front end 204 and/or the wireless transceiver(s) 206 to implement the techniques described herein for handling PLMN selection while user equipment (UE) is in an inactive mode at a radio resource control layer.

CRM 212 also includes a resource control module 250. Alternatively or additionally, the resource control module 250 may be implemented in whole or part as hardware logic or circuitry integrated with or separate from other components of the UE 110. In at least some aspects, the resource control module 250 handles PLMN selection while user equipment is in an inactive mode at a radio resource control layer to implement the techniques described herein.

Figure 4:
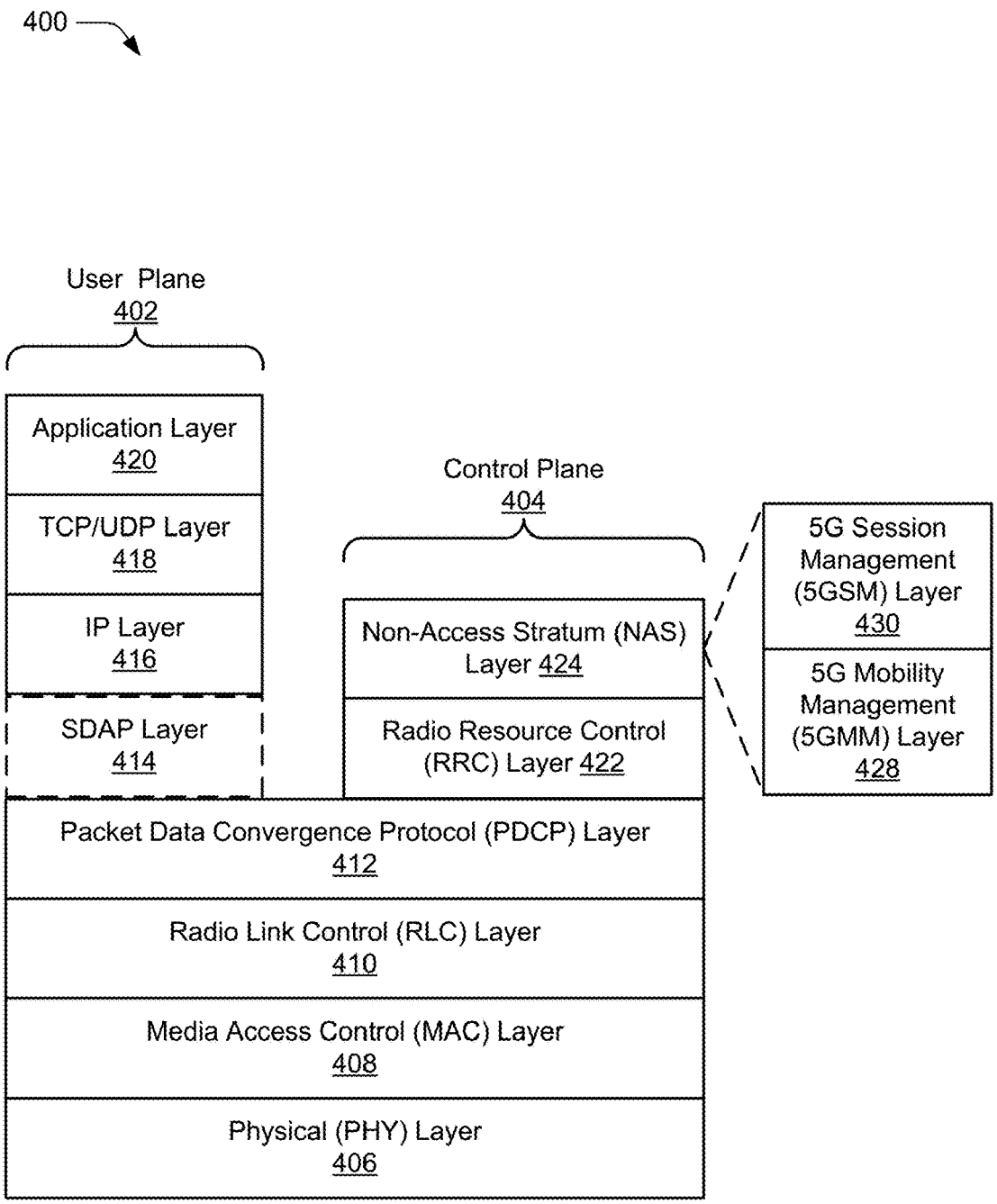
FIG. 4 illustrates an example wireless networking stack with which aspects of handling PLMN selection while a UE is in an inactive mode at a radio resource control layer can be implemented.

The resource control module 250 can implement a Non-Access Stratum (NAS) layer, a 5GMM layer, a radio resource control (RRC) layer, and/or other protocol layers, as described according to the wireless communication standard and shown in FIG. 4. The resource control module 250 determines the resource control state (e.g., the connected state, the inactive state, the idle state) and causes wireless transceiver(s) 206 (e.g., LTE transceiver, 5G NR transceiver) to perform operations according to the resource control state. The resource control module 250 can at least partially implement handling PLMN selection while user equipment is in an inactive mode at a radio resource control layer, as further described in FIG. 4.

The device diagram for the base stations 120, illustrated in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), and/or one or more wireless transceiver(s) 256 for communicating with the UE 110. The RF front end 254 of the base stations 120 can couple or connect the wireless transceiver(s) 256 to the antennas 252 to facilitate various types of wireless communication. The antennas 252 of the base stations 120 may include an array of multiple antennas that are configured similar to or different from each other. The antennas 252 and the RF front end 254 can be tuned to, and/or be tunable to, one or more frequency band defined by the 3GPP LTE and 5G NR communication standards and are implemented by the wireless transceiver(s) 256. Additionally, the antennas 252, the RF front end 254, and/or the wireless transceiver(s) 256 may be configured to support beamforming, such as Massive-MIMO, for the transmission and reception of communications with the UE 110.

The base stations 120 also include processor(s) 260 and computer-readable storage media 262 (CRM 262). The processor 260 may be a single-core processor or a multiple-core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by the processor(s) 260 to enable communication with the UE 110.

CRM 262 also includes a base station manager 266. Alternatively or additionally, the base station manager 266 may be implemented in whole or part as hardware logic or circuitry integrated with or separate from other components of the base stations 120. In at least some aspects, the base station manager 266 configures the wireless transceiver(s) 256 for communication with the UE 110, as well as communication with a core network. The base stations 120 include an inter-base station interface 268, such as an Xn and/or X2 interface, which the base station manager 266 configures to exchange user-plane and control-plane data with another base station 120, to manage the communication of the base stations 120 with the UE 110. The base stations 120 include a core network interface 270 that the base station manager 266 configures to exchange user-plane and control-plane data with core network functions and entities.

User Equipment Radio Resource Control States

Figure 3:
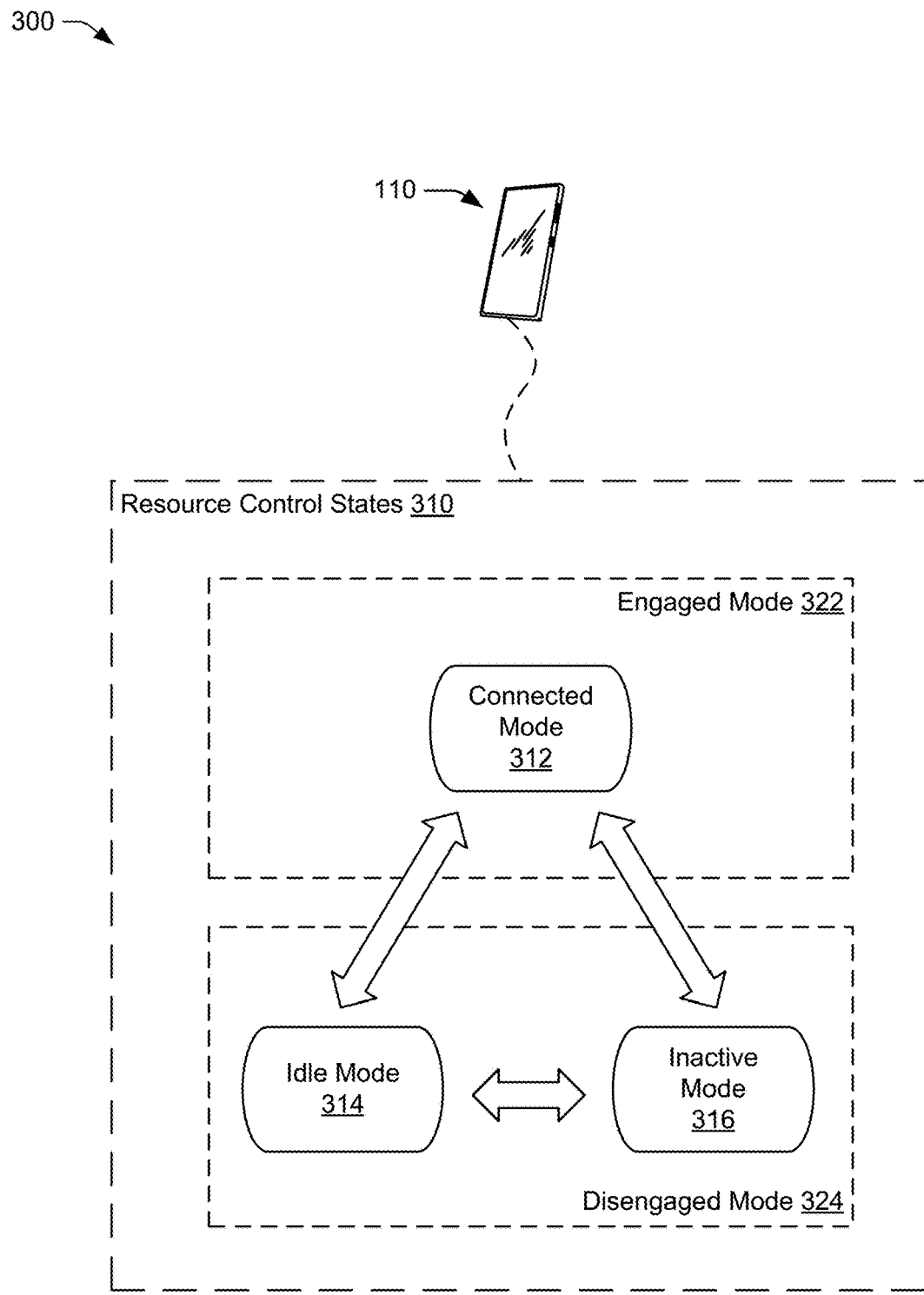
FIG. 3 illustrates example user equipment radio resource control states, which may implement various aspects of handling PLMN selection while a UE is in an inactive mode at a radio resource control layer.

FIG. 3 illustrates example user equipment radio resource control states 300, which may benefit from aspects of handling PLMN selection while user equipment is in an inactive mode at a radio resource control layer. A wireless network operator provides its telecommunication services to user equipment through a wireless network. To communicate wirelessly with the network, user equipment 110 utilizes a radio resource control (RRC) procedure to establish a radio connection to the network via a cell (e.g., a base station, a serving cell). Upon establishing the radio connection to the network via the base station 121, the UE 110 enters a connected mode 312 (e.g., RRC connected mode, which is also referred to as, RRC_CONNECTED state, NR-RRC CONNECTED state, E-UTRA RRC CONNECTED state). In general, if the UE 110 is in the radio resource control (RRC) connected mode 312, the radio connection with the base station 121 is active.

The UE 110 operates according to different resource control states 310. Different situations may occur that cause the UE 110 to transition between different resource control states 310 as determined by the radio access technology. Examples of the resource control states 310 illustrated in FIG. 3 include a connected mode 312, an idle mode 314, and an inactive mode 316. User equipment 110 is either in the connected mode 312 or in the inactive mode 316 when an RRC connection is active. If an RRC connection is not active, then the user equipment 110 is in the idle mode 314.

In establishing an RRC connection, the user equipment 110 may transition from the idle mode 314 to the connected mode 312. After establishing the connection, the user equipment 110 may transition (e.g., upon connection inactivation) from the connected mode 312 to an inactive mode 316 (e.g., RRC inactive mode, which is also referred to as RRC_I-

NACTIVE state, NR-RRC INACTIVE state) and the user equipment 110 may transition (e.g., via an RRC connection resume procedure) from the inactive mode 316 to the connected mode 312. After establishing the RRC connection, the user equipment 110 may transition between the connected mode 312 to an idle mode 314 (e.g., RRC idle mode, which is also referred to as RRC IDLE state, NR-RRC IDLE state, E-UTRA RRC IDLE state, 5GMM-IDLE), for instance upon the network releasing the RRC connection. The user equipment 110 may transition between the inactive mode 316 and the idle mode 314.

The UE 110 may be in an engaged mode 322 or may be in a disengaged mode 324. As used herein, an engaged mode 322 is a connected mode (e.g., the connected mode 312) and a disengaged mode 324 is an idle, disconnected, connected-but-inactive, or connected-but-dormant mode (e.g., idle mode 314, inactive mode 316). In some cases, in the disengaged mode 324 (e.g., RRC_INACTIVE), the UE 110 may still be NAS registered with radio bearer active.

Each of the different resource control states 310 have different quantities or types of resources available, which may affect power consumption within the UE 110. In general, the connected mode 312 represents the UE 110 actively connected to (engaged with) the base station 121. In the inactive mode 316, the UE 110 suspends connectivity with the base station 121 and retains information that enables connectivity with the base station 121 to be quickly re-established. In some cases, the cell-reselection procedure may select a serving cell (e.g., provided by a first base station) in a different PLMN network than the currently-selected PLMN network. In the idle mode 314, the UE 110 releases the radio connection with the base station 120. Some of the resource control states 310 may be limited to certain radio access technologies. For example, the inactive mode 316 may be supported in LTE Release 15 (eLTE), 5G NR, and 6G, but not in 3G or previous generations of 4G standards. Other resource control states may be common or compatible across multiple radio access technologies, such as the connected mode 312 and/or the idle mode 314. In the inactive mode 316 and/or the idle mode 314, the UE 110 may perform the cell-reselection procedure, which is further described with respect to FIG. 5.

User Plane and Control Plane Signaling

FIG. 4 illustrates an example block diagram of a wireless network stack model 400 (stack 400). The stack 400 characterizes a communication system for the example environment 100, in which various aspects of handling PLMN selection while user equipment is in an inactive mode at a radio resource control layer can be implemented. In reference to the protocol stack, the terms "upper layer" and "lower layer" are relative to one another, with each layer in the protocol stack being an "upper layer" to a layer lower in the protocol stack (a "lower layer"). For example, an upper layer may correspond to the NAS layer, the upper layer may correspond to a 5GMM layer, and/or a lower layer may correspond to the AS layer. The lower layer may also correspond to a Radio Resource Control (RRC) layer. A protocol stack may support various protocol layers, including NAS, RRC, Packet Data Convergence Protocol (PDCP), Radio Link Control (RLC), Medium Access Control (MAC), and Physical Layer (PHY).

The wireless network stack 400 includes a user plane 402 and a control plane 404. Upper layers of the user plane 402 and the control plane 404 share common lower layers in the wireless network stack 400. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical layer 406 (PHY layer 406), a Media Access Control layer 408 (MAC layer 408), a Radio Link Control layer 410 (RLC layer 410), and a Packet Data Convergence Protocol layer 412 (PDCP layer 412). The physical layer 406 provides hardware specifications for devices that communicate with each other. As such, the physical layer 406 establishes how devices connect to each other, assists in managing how communication resources are shared among devices, and the like.

The MAC layer 408 specifies how data is transferred between devices. Generally, the MAC layer 408 provides a way in which data packets being transmitted are encoded and decoded into bits as part of a transmission protocol.

The RLC layer 410 provides data transfer services to higher layers in the wireless network stack 400. Generally, the RLC layer 410 provides error correction, packet segmentation and reassembly, and management of data transfers in various modes, such as acknowledged, unacknowledged, or transparent modes.

The PDCP layer 412 provides data transfer services to higher layers in the wireless network stack 400. Generally, the PDCP layer 412 provides transfer of user plane 402 and control plane 404 data, header compression, ciphering, and integrity protection.

Above the PDCP layer 412, the wireless network stack 400 splits into the user-plane stack 402 and the control-plane stack 404. Layers of the user plane 402 include an optional Service Data Adaptation Protocol layer 414 (SDAP layer 414), an Internet Protocol layer 416 (IP layer 416), a Transmission Control Protocol/User Datagram Protocol layer 418 (TCP/UDP layer 418), and an application layer 420, which transfers data using the wireless link 106. The optional SDAP layer 414 is present in 5G NR networks. The SDAP layer 414 maps a Quality of Service (QoS) flow for each data radio bearer and marks QoS flow identifiers in uplink and downlink data packets for each packet data session. The IP layer 416 specifies how the data from the application layer 420 is transferred to a destination node. The TCP/UDP layer 418 is used to verify that data packets intended to be transferred to the destination node reached the destination node, using either TCP or UDP for data transfers by the application layer 420. In some implementations, the user plane 402 may also include a data services layer (not shown) that provides data transport services to transport application data, such as IP packets including web browsing content, video content, image content, audio content, or social media content, and so forth.

The control plane 404 includes Radio Resource Control layer 422 (RRC layer 422) and a Non-Access Stratum layer 424 (NAS layer 424). The RRC layer 422 establishes and releases radio connections and radio bearers, broadcasts system information, or performs power control. The RRC layer 422 also controls a resource control states 310 of the UE 110 and causes the UE 110 to perform operations according to the resource control states 310. Generally, the RRC layer 422 supports 3GPP access but does not support non-3GPP access (e.g., WLAN communications).

The NAS layer 424 provides support for mobility management (e.g., using a Fifth Generation Mobility Management (5GMM) layer 428) and packet data bearer contexts (e.g., using a Fifth Generation Session Management (5GSM) layer 430) between the user equipment 110 and entities or functions in the core network, such as the Access and Mobility Management Function 152 (AMF 152) of the 5GC 150 or the like. The NAS layer 424 supports both 3GPP access and non-3GPP access, or the Mobility Management Entity 162 (MME 162), or the like.

In the UE 110, each layer in both the user plane 402 and the control plane 404 of the wireless network stack 400 interacts with a corresponding peer layer or entity in a base station 120, a core network entity or function, and/or a remote service, to support user applications and control operation of the UE 110 in the RAN 140.

Example Techniques and Apparatuses

Consider that the UE 110 is in the connected mode 312 and establishes a radio connection via a cell-selection procedure with base station 121, which supports PLMN 105. After establishing the radio connection, the UE 110 transitions from the connected mode 312 to the inactive mode 316. According to current 3GPP standards, a UE 110 can be in an inactive mode at a radio resource control layer when: (1) the UE 110 is in 5GMM-CONNECTED mode with RRC inactive indication at the NAS layer (5GMM), or (2) the UE 110 is in RRC_INACTIVE state at the RRC layer. A UE 110 is in 5GMM-CONNECTED mode with RRC inactive indication when the UE 110 is in (a) 5GMM-CONNECTED mode over 3GPP access at the NAS layer and (b) RRC_INACTIVE state at the Access Stratum (AS) layers. A UE 110 is in 5GMM-CONNECTED mode over 3GPP access when an N1 NAS signaling connection between the UE 110 and network over 3GPP access exists. The N1 NAS signaling connection is a peer-to-peer N1 mode connection between the UE 110 and an Access and Mobility Management Function (AMF) 152 in the core network.

While in the inactive mode 316, for instance as the UE 110 moves to a different geographical location, the NAS layer 424 of the UE 110 may perform another cell-selection procedure that selects another cell (e.g., another base station 124). The cell-selection procedure may also be referred to as a cell-reselection procedure, which enables the UE 110 to change or switch to a different cell within the network. In this example, the UE 110 selects base station 124, which supports PLMN 155. Although the UE 110 is described as being in the inactive mode 316, these techniques can be applied to other types of resource control states 310 that may not be supported by the selected cell.

The UE 110 normally operates on its home PLMN, the primary PLMN operated by the carrier from which the user of the UE 110 has a subscription. Where the carrier does not have cell coverage but does have a roaming agreement with a local carrier, access to the local carrier's network may be available to the user via an Equivalent PLMN. A base station 120 in the home PLMN broadcasts a system information message SIB1 that includes information regarding Public Land Mobile Network (PLMN) identities, as well as Equivalent PLMN identities (a list of Equivalent PLMNs to which the UE 110 can register).

The UE 110 performs a process of selecting a Public Land Mobile Network (PLMN) in order to receive mobile communication services. Through the process, the NAS layer 424 of the UE 110 identifies a selected home PLMN, requests registration towards the selected home PLMN, and registers with the selected home PLMN 105 (the "registered PLMN" 105).

After this selection and registration to the registered PLMN 105, the NAS layer 424 of the UE 110 may select a new PLMN that is not a home PLMN 105. If the new PLMN is not an Equivalent PLMN to the registered PLMN 105, then the UE 110 enters into an idle mode 314 (e.g., 5GMM-IDLE mode) over 3GPP access at the NAS layer 424 (no N1 interface NAS signaling connection between the UE 110 and network over 3GPP access exists).

In such an instance, the RRC layer 422 (in an inactive mode 316 (e.g., RRC_INACTIVE state)) of the UE 110 does not know that the upper layers already left inactive mode 316 (the NAS layer 424 is no longer in 5GMM-CONNECTED mode with RRC inactive indication but is now in 5GMM-IDLE mode). As a result, there is a state mismatch between at least one upper layer (e.g., NAS layer 424, 5GMM layer 428) and at least one lower layer (e.g., AS layer).

As a result of the state mismatch between the NAS layer 424 and the AS layer, a situation may arise where the NAS layer 424 may request the RRC layer 422 to establish an RRC connection while the RRC layer 422 is in an inactive mode 316. According to current specification, the RRC layer 422 will ignore this request from an upper layer (the NAS layer 424). Furthermore, the RRC layer 422 may perform the redundant radio access network-based (RAN-based) notification area (RNA) update procedure and waste its power in inactive mode 316 (since the NAS layer 424 is already in idle mode 314, the RNA update is not needed).

In one aspect, the resource control module 250 of the UE 110 utilizes the wireless transceiver 206 to connect to the base station 121 using the wireless link 106. The resource control module 250 of the UE 110 then performs a PLMN selection procedure that selects a PLMN, such as PLMN 105, to request registration in order to receive mobile communication services. The resource control module 250 selects PLMN 105 (registered PLMN 105). At such a time, the upper layer (e.g., NAS layer 424, 5GMM layer 428) is in a connected mode 312.

In some cases, at or after the time the resource control module 250 selects the registered PLMN 105, the resource control module 250 obtains a list of equivalent PLMN from the base station 121. The resource control module 250 may store the list of equivalent PLMN on the computer-readable storage media (CRM) 212, e.g., as a stored list.

After a period of time, the upper layer (e.g., NAS layer 424, 5GMM layer 428) of the UE 110 transitions to an inactive mode 316 (e.g., the UE transition to 5GMM-CONNECTED mode with RRC inactive indication at the NAS layer 424 (5GMM)). After the upper layer of the UE 110 transitions to an inactive mode 316, the resource control module 250 selects a new PLMN (PLMN 155) to request registration to. The new PLMN 155 may be one or more new PLMN(s).

The new PLMN 155 may be served by the same base station (e.g., base station 121, base station 123) as the registered PLMN 105 or the new PLMN 155 may be served by a different base station (e.g., base station 122, base station 124) as the registered PLMN 105. In example environment 100, the registered PLMN 105 includes NR RAN 141 (that includes base stations 121 and 123) and the new PLMN 155 includes RAN 142 (that includes base stations 122 and 124).

In some cases, the UE 110 selects register to a new PLMN that is not an equivalent PLMN to the registered PLMN 105. In some cases, the resource control module 250 is configured to determine if the new PLMN 155 is an equivalent to the registered PLMN 105 (e.g., reviewing the stored list to determine whether the new PLMN 155 is on the list of equivalent PLMN stored on the computer-readable storage media 212).

In some cases, as the UE 110 moves to a different geographical location while in the inactive state at a radio resource control layer, such as towards the base station 124, the UE 110 may perform a cell reselection procedure (i.e., cell-reselection procedure) to select or determine another cell (e.g., another base station 120) to camp on. In order to generalize a NAS request for the UE to perform either a cell-selection procedure or a cell-reselection procedure These procedures may collectively be referred to as a cell (re)selection procedure.

In some cases, after the new PLMN 155 selection, the upper layer (e.g., NAS layer 424, 5GMM layer 428) of the UE 110 enters an idle mode 314 (e.g., 5GMM-IDLE mode) and sends an indication to a lower layer (e.g., RRC layer 422) of the UE 110. The indication may include at least one of following information: (a) request information asking (directing) the lower layer to enter an RRC idle mode 314 (e.g., RRC IDLE, NR-RRC IDLE); (b) an indication that the new PLMN(s) (e.g., new PLMN 155) is not an equivalent PLMN to the registered PLMN 105; (c) an indication that the UE 110 is in an idle mode 314 (e.g., 5GMM-IDLE); or (d) a cell (re)selection request (e.g., asking the UE 110 to perform a cell (re)selection procedure to select or reselect to a cell that belongs to the new PLMN(s) 105).

In some cases, after the lower layer receives the request information from at least one of the NAS layer 424 or the 5GMM layer 428 of the UE 110 asking the lower layer to enter an idle mode 314 (e.g., NR-RRC IDLE), the lower layer enters the idle mode 314 (e.g., RRC_IDLE).

In some cases, after the lower layer receives the request information from the NAS layer 424 or 5GMM layer 428 of the UE 110 asking lower layer to enter idle mode 314 (e.g., NR-RRC IDLE), the lower layer then releases at least one of: the UE Access Stratum (AS) context, the security context, or inactive configurations, and the lower layer enters idle mode 314 (e.g., RRC_IDLE). In such a case, the UE AS context may include at least one of: current RRC configuration, the current security context, the packet data convergence protocol (PDCP) state (including Robust Header Compression (ROHC) state), service data adaption protocol (SDAP) configuration, cell-radio network temporary identification (C-RNTI) used in the source primary cell (PCell), the information element cellIdentity, or the physical cell identity of the source PCell.

In some cases, after the lower layer receives the indication from the NAS layer 424 or 5GMM layer 428 of the UE 110 that the new selected PLMN(s) is not an equivalent PLMN to the registered PLMN 105, the lower layer enters idle mode 314 (e.g., RRC_IDLE). In some cases, after the lower layer receives the indication from the NAS layer 424 or 5GMM layer 428 of the UE 110 that the new selected PLMN(s) is not an equivalent PLMN to the registered PLMN 105, the lower layer releases at least one of: the UE AS context, the security context, or inactive configurations before it enters the idle mode 314, and the lower layer enters idle mode 314 (e.g., RRC_IDLE). In such a case, the UE AS context may include at least one of: current RRC configuration, the current security context, the packet data convergence protocol (PDCP) state (including Robust Header Compression (ROHC) state), service data adaption protocol (SDAP) configuration, cell-radio network temporary identification (C-RNTI) used in the source primary cell (PCell), the information element cellIdentity, or the physical cell identity of the source PCell. In some cases, the lower layer sends an indication to the UE 110 (e.g., to the upper layers) after the lower layer enters the idle mode 314 (e.g., RRC_IDLE). In some cases, the lower layer stops and releases the timer (e.g., T309, T390, T380, T319) related to inactive mode 316.

In some cases, after the lower layer receives the indication from the NAS layer 424 or 5GMM layer 428 of the UE 110 that the UE 110 is in idle mode 314 (e.g., 5GMM-IDLE), the lower layer enters idle mode 314 (e.g., RRC_IDLE).

In some cases, after the lower layer receives the indication from the NAS layer 424 or 5GMM layer 428 of the UE 110 that the UE 110 is in idle mode 314 (e.g., 5GMM-IDLE), the lower layer enters idle mode 314 (e.g., RRC_IDLE) and sends an indication to the UE 110 (e.g., to the upper layers) after the lower layer enters the idle mode 314 (e.g., RRC_IDLE). In some cases, the lower layer stops and releases the timer (e.g., T380, T319) related to inactive mode 316.

In some cases, after the lower layer receives the indication from the NAS layer 424 or 5GMM layer 428 of the UE 110 that the UE 110 is in idle mode 314 (e.g., 5GMM-IDLE), the lower layer releases at least one of: the UE AS context, the security context, or inactive configurations before it enters the idle mode 314, and the lower layer enters idle mode 314 (e.g., RRC_IDLE). In such a case, the UE AS context may include at least one of: current RRC configuration, the current security context, the packet data convergence protocol (PDCP) state (including Robust Header Compression (ROHC) state), service data adaption protocol (SDAP) configuration, cell-radio network temporary identification (C-RNTI) used in the source primary cell (PCell), the information element cellIdentity, or the physical cell identity of the source PCell. In some cases, the lower layer sends an indication to the UE 110 (e.g., to the upper layers) after the lower layer enters the idle mode 314 (e.g., RRC_IDLE). In some cases, the lower layer stops and releases the timer (e.g., T380, T319) related to inactive mode 316.

In some cases, after the lower layer (e.g., RRC layer 422) of the UE 110 receives the cell (re)selection request from the NAS layer 424 or 5GMM layer 428 of the UE 110 and finding the selected PLMN(s) is not equivalent PLMN, the lower layer enters idle mode 314.

In some cases, after the lower layer (e.g., RRC layer 422) of the UE 110 receives the cell (re)selection request from the NAS layer 424 or 5GMM layer 428 of the UE 110 and finding the selected PLMN(s) is not equivalent PLMN, the lower layer releases at least one of: the UE AS context, the security context, or inactive configurations after or before it enters the idle mode 314, and the lower layer enters the idle mode 314. In such a case, the UE AS context may include at least one of: current RRC configuration, the current security context, the packet data convergence protocol (PDCP) state (including Robust Header Compression (ROHC) state), service data adaption protocol (SDAP) configuration, cell-radio network temporary identification (C-RNTI) used in the source primary cell (PCell), the information element cellIdentity, or the physical cell identity of the source PCell. In some cases, the lower layer sends an indication to the UE 110 (e.g., to the upper layers) after the lower layer enters the idle mode 314 (e.g., RRC_IDLE). In some cases, the lower layer stops and releases the timer (e.g., T380, T319) related to the inactive mode 316.

In some cases, the UE 110 selects a new PLMN 155 that is an equivalent PLMN to the registered PLMN 105. In some cases, if the resource control module 250 is configured to determine if new PLMN 155 is an equivalent to the registered PLMN 105 (e.g., whether the new PLMN 155 is on the list of equivalent PLMN stored on the computer-readable storage media 212). If the resource control module 250 determines that new PLMN 155 is an equivalent to the registered PLMN 105, then the UE 110 will select the new PLMN 155.

In some cases, after the new PLMN 155 selection, the UE 110 sends an indication to lower layer (e.g., RRC layer 422) of the UE 110. The indication includes at least one of the following information: (a) request information asking lower layer to stay in connected mode 312 (e.g., NR-RRC CONNECTED); (b) an indication that the new selected PLMN(s) is equivalent PLMN to the registered PLMN 105; (c) an indication that the UE 110 is in inactive mode 316 (e.g., 5GMM-CONNECTED mode with RRC inactive indication); or (d) a cell (re)selection request (asking UE 110 to perform cell (re)selection procedure to select or (re)select a cell belongs to new PLMN(s)).

In some cases, after receiving at least one of: (a) request information asking lower layer to stay in connected mode 312 (e.g., NR-RRC CONNECTED), (b) an indication that the new selected PLMN(s) is equivalent PLMN to the registered PLMN 105, or (c) an indication that the UE 110 is in inactive mode 316 (e.g., 5GMM-CONNECTED mode with RRC inactive indication), the information from the UE 110, the lower layer stays in inactive mode 316.

In some cases, after receiving a cell (re)selection request (asking UE 110 to perform cell (re)selection procedure to select or (re)select a cell belongs to new PLMN(s)), finding the selected PLMN(s) is equivalent PLMN the lower layer stays in inactive mode 316.

In some cases, the UE 110 selects a new PLMN 155 that is an equivalent PLMN to the registered PLMN 105. In some cases, the resource control module 250 is configured to determine if new PLMN 155 is an equivalent to the registered PLMN 105 (e.g., whether the new PLMN 155 is on the list of equivalent PLMN stored on the computer-readable storage media 212). If the resource control module 250 determines that new PLMN 155 is an equivalent to the registered PLMN 105, then the UE 110 will select the new PLMN 155. After the new PLMN 155 selection, the UE 110 sends an indication to lower layer (e.g., RRC layer 422) of the UE 110. The indication includes at least one of the following information: (a) request information asking lower layer to stay in connected mode 312 (e.g., NR-RRC CONNECTED); (b) an indication that the new selected PLMN(s) 155 is equivalent PLMN to the registered PLMN 105; (c) an indication that the UE 110 is in inactive mode 316 (e.g., 5GMM-CONNECTED mode with RRC inactive indication); or (d) a cell (re)selection request (asking UE 110 to perform cell (re)selection procedure to select or (re)select a cell that belongs to new PLMN(s) 155). In some cases, if the resource control module 250 determines that the new PLMN 155 does not belong to (is not associated with) a Radio Access Network (RAN) 140 notification area of the UE 110, the lower layer performs a RAN notification area update procedure.

In one aspect, a UE 110 (e.g., the RRC layer 422 of the UE 110) is in inactive mode 316 and receives an RRC connection establishment request from the upper layers (e.g., NAS layer 424, 5GMM layer 428) of the UE 110. After receiving the RRC connection establishment request, the UE 110 performs the RRC connection establishment procedure.

In some cases, responsive to the RRC connection establishment request the UE 110 releases at least one of the UE AS context, the security context, or inactive configurations. In such a case, the UE AS context may include at least one of: current RRC configuration, the current security context, the packet data convergence protocol (PDCP) state (including Robust Header Compression (ROHC) state), service data adaption protocol (SDAP) configuration, cell-radio network temporary identification (C-RNTI) used in the source primary cell (PCell), the information element cellIdentity, or the physical cell identity of the source PCell. In some cases, the UE 110 stops and releases the timer (e.g., T380, T319) related to inactive mode 316.

In some cases, the UE 110 starts a timer related to call setup (e.g., T300 timer) and sends the RRC setup request message to the network. In some cases, the UE 110 starts the T300 timer, the UE 110 sends the RRC setup request message to the network, and the UE 110 applies the default radio bearer configuration that includes at least one of: physical channel configuration, semi-persistent scheduling configuration, MAC main configuration, or common control channel (CCCH) configuration.

Example Methods

Figure 5:
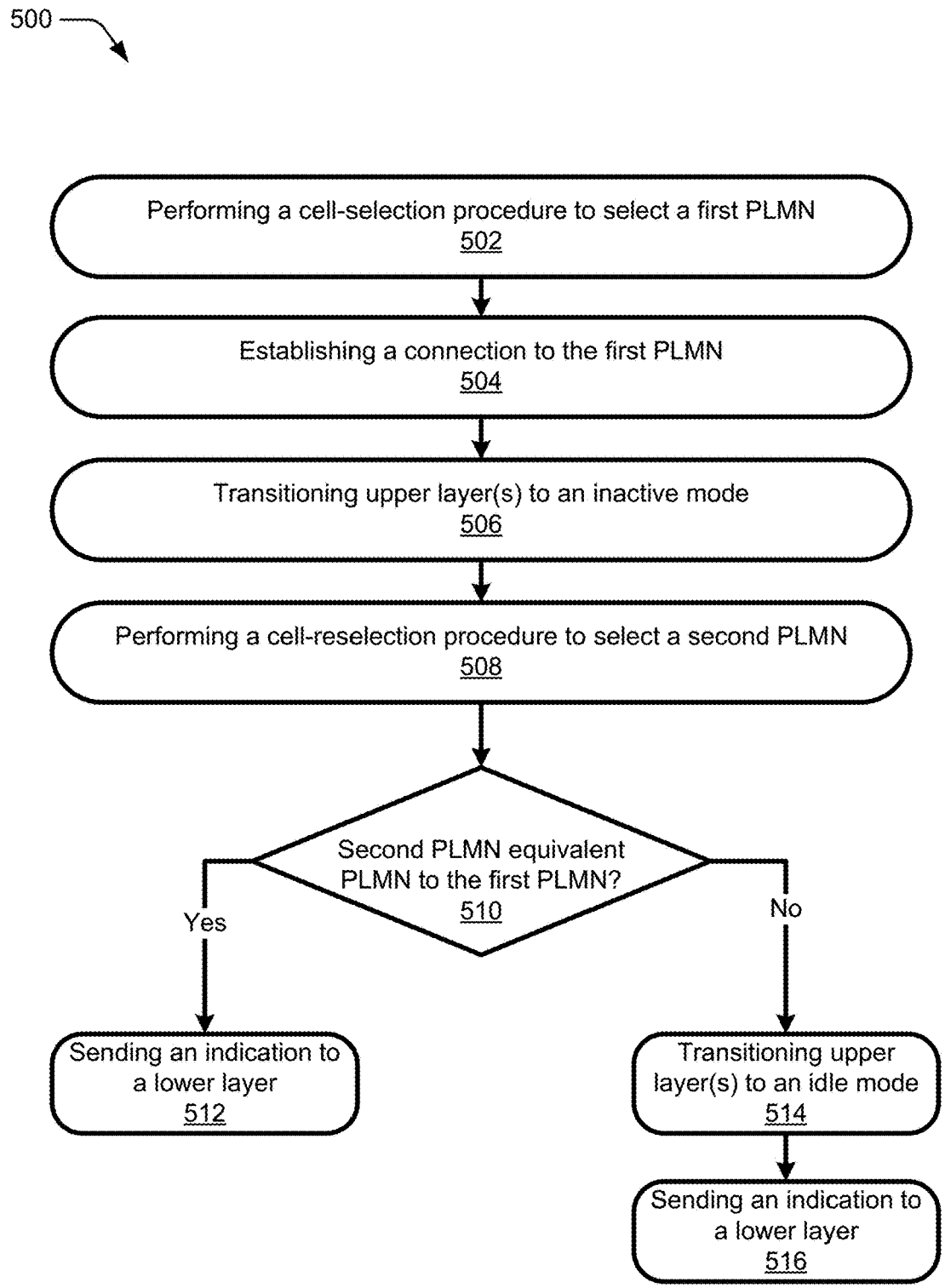
FIG. 5 illustrates an example method of handling PLMN selection while a UE is in an inactive mode at a radio resource control layer.
Figure 6:
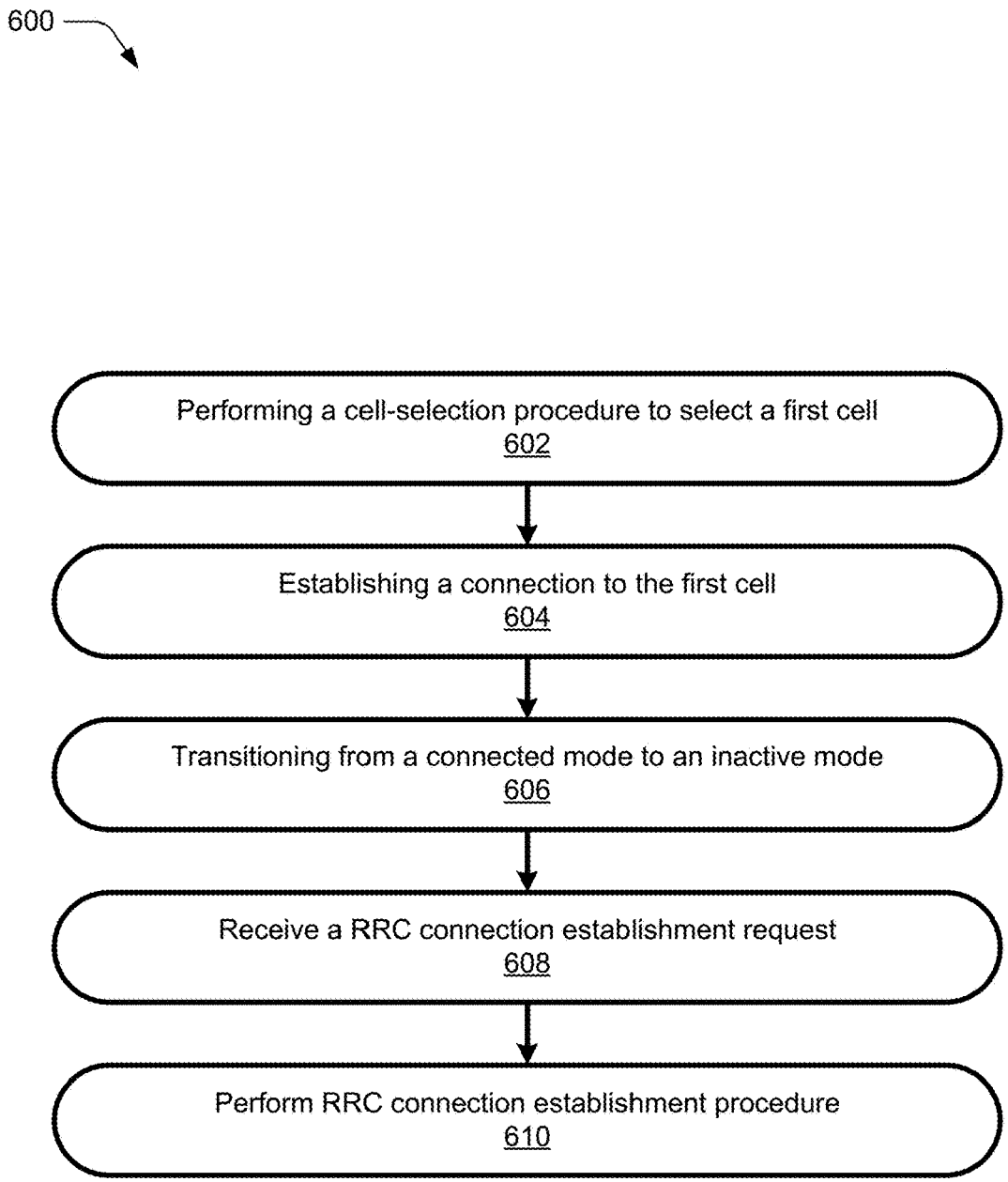
FIG. 6 illustrates an example method of handling PLMN selection while a UE is in an inactive mode at a radio resource control layer.

FIG. 5 and FIG. 6 respectively depict example methods 500 and 600 of handling Public Land Mobile Network (PLMN) selection while user equipment is in an inactive mode at a radio resource control layer. Methods 500 and 600 are shown as sets of operations (or acts) performed but not necessarily limited to the order or combinations in which the operations are shown herein. Further, any of one or more of the operations may be repeated, combined, reorganized, skipped, or linked to provide a wide array of additional and/or alternate methods. In portions of the following discussion, reference may be made to environment 100 and the device diagrams 200 of FIGS. 1 and 2 and entities detailed in FIG. 1, reference to which is made for example only. The techniques are not limited to performance by one entity or multiple entities operating on one device.

In methods 500 and 600, the user equipment (UE) may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base stations may represent or be implemented as another device, radio access node, wireless communication node, or another suitable piece of equipment that facilitates wireless communication (via a wireless link) between UE and a communication network, such as a NodeB base station, a Next Generation Base NodeB (gNB) base station, an Enhanced NodeB (eNB) base station, an evolved NodeB (eNodeB) base station, a Global System for Mobile Communication (GSM) base station, a code-division multiple-access (CDMA) base station, a base transceiver system, a Wireless Local Access Network (WLAN) router, a satellite, a terrestrial television broadcast tower, an access point, a peer-to-peer device, another smartphone acting as a base station, and so forth.

FIG. 5 illustrates a method 500 of handling Public Land Mobile Network (PLMN) selection while user equipment in an inactive mode at a radio resource control layer. At 502, the UE performs a cell-selection procedure that selects a first cell that serves a first Public Land Mobile Network (PLMN). At 504, the UE establishes a radio connection to the first PLMN. For example, the UE 110 performs a cell-selection procedure that selects a base station 121 that serves PLMN 105 and establishes a radio connection to PLMN 105.

At 506, the upper layer(s) of the UE transition from a connected mode to an inactive mode. For example, the NAS layer 424 or the 5GMM layer 428 of the UE 110 can transition from a connected mode 312 (e.g., 5GMM-CONNECTED) to an inactive mode 316 (e.g., 5GMM-IDLE).

At 508, after a period of time, the UE performs a cell-reselection procedure that selects a second PLMN. For example, the UE 110 performs a cell-reselection procedure that selects PLMN 155. At 510, the UE determines if the second PLMN is an equivalent PLMN to the first PLMN. If the second PLMN is an equivalent PLMN to the first PLMN, at 512 the UE sends an indication to a lower layer that triggers an action. For example, UE 110 determines if PLMN 155 is an equivalent PLMN to PLMN 105. If the PLMN 155 is an equivalent PLMN to the PLMN 105, then the UE 110 sends an indication to a lower layer (e.g., the RRC layer 422) that triggers an action. In an additional aspect, the indication includes at least one of: request information asking the lower layer to stay in a connected mode, information indicating that the second PLMN is an equivalent PLMN to the first PLMN, information indicating that the UE is in an inactive mode at a radio resource control layer, or a cell (re)selection request.

If the second PLMN is not an equivalent PLMN to the first PLMN, at 514 an upper layer(s) of the UE is transitioned to an idle mode and at 516 an indication is sent to a lower layer that triggers an action. For example, if PLMN 155 is not an equivalent PLMN to the PLMN 105, an upper layer (e.g., NAS layer 424, 5GMM layer 428) of the UE 110 is transitioned to an idle mode 314 (e.g., 5MM-IDLE) and an indication is sent to a lower layer (e.g., RRC layer 422) that triggers an action. In an additional aspect, the indication includes at least one of: request information asking the lower layer to enter RRC idle state, information indicating that the second PLMN is not an equivalent PLMN to the first PLMN, information indicating that the upper layer of the UE is in idle mode, or a cell (re)selection request asking the UE to perform a cell (re)selection procedure to select or (re)select a cell that belongs to the second PLMN.

FIG. 6 illustrates a method 600 for handling Public Land Mobile Network (PLMN) selection while user equipment is in an inactive mode at a radio resource control layer. At 602, the UE performs a cell-selection procedure that selects a first cell. At 604, the UE establishes a radio connection to the first cell. For example, the UE 110 performs a cell-selection procedure that selects a base station 121 that serves PLMN 105 and establishes a radio connection to PLMN 105.

At 606, the UE transitions from a connected mode to an inactive mode. For example, the NAS layer 424 of the UE 110 can transition from a connected mode 312 (e.g., 5GMM-CONNECTED) to an inactive mode 316 (e.g., 5GMM-IDLE). At 608, in a Radio Resource Control (RRC) connection establishment request is received from an upper layer. For example, an RRC connection establishment request can be received by the UE 110 from NAS layer 424 or 5GMM layer 428. At 610, in response to the RRC connection establishment request, the UE performs an RRC connection establishment procedure.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

EXAMPLES

In the following, some examples are described.

Example 1: An apparatus, comprising: a resource control module configured to: perform a cell-selection procedure that selects a first cell that serves a first Public Land Mobile Network (PLMN); identify the first PLMN; establish a radio connection to the first PLMN; transition the apparatus from a connected state to an inactive state; identify a second PLMN; in response to identifying a second PLMN, perform a cell-reselection procedure that selects the second PLMN; determine that the second PLMN is not an equivalent PLMN to the first PLMN; and in response to determining that the second PLMN is not an equivalent PLMN to the first PLMN, transition an upper layer of the apparatus to an idle mode and send an indication to a lower layer that triggers an action, wherein the indication comprises at least one of: request information asking the lower layer to enter a RRC idle state, information indicating that the second PLMN is not an equivalent PLMN to the first PLMN, information indicating that the upper layer of the apparatus is in idle mode, and a cell (re)selection request asking the apparatus to perform a cell (re)selection procedure to select or (re)select a cell that belongs to the second PLMN.

Example 2: The apparatus of example 1, wherein the upper layer idle mode is 5GMM-IDLE.

Example 3: The apparatus of at least one of examples 1 or 2, wherein the RRC idle state is NR-RRC IDLE.

Example 4: The apparatus of at least one of the preceding examples, wherein the lower layer receives the request information asking the lower layer to enter RRC idle mode, and wherein responsive to receiving the request information, the lower layer enters the RRC idle mode.

Example 5: The apparatus of at least one of the preceding examples, wherein the lower layer receives the request information asking the lower layer to enter the RRC idle mode; wherein responsive to receiving the request information, the lower layer releases at least one of an access stratum context, a security context, and at least one inactive configuration; and wherein responsive to receiving the request information, the lower layer enters the idle mode.

Example 6: The apparatus of at least one of the preceding examples, wherein the access stratum context comprises at least one of a current RRC configuration, a current security context, a packet data convergence protocol (PDCP) state (including Robust Header Compression (ROHC) state), a service data adaption protocol (SDAP) configuration, a cell-radio network temporary identification (C-RNTI) used in a source primary cell (PCell), an information element cellIdentity, or a physical cell identity of the source PCell.

Example 7: The apparatus of at least one of the preceding examples, wherein in response to the lower layer receives the information indicating that the second PLMN is not an equivalent PLMN to the first PLMN, the lower layer enters the idle mode.

Example 8: The apparatus of at least one of the preceding examples, wherein in response to the lower layer receiving the information indicating that the second PLMN is not an equivalent PLMN to the first PLMN, the lower layer releases at least one of an access stratum context, a security context, or at least one inactive configuration; and wherein the lower layer enters the idle mode.

Example 9: The apparatus of at least one of the preceding examples, wherein the access stratum context comprises at least one of a current RRC configuration, a current security context, a packet data convergence protocol (PDCP) state (including Robust Header Compression (ROHC) state), a service data adaption protocol (SDAP) configuration, a cell-radio network temporary identification (C-RNTI) used in a source primary cell (PCell), an information element cellIdentity, or a physical cell identity of the source primary cell (PCell).

Example 10: The apparatus of at least one of the preceding examples, wherein the lower layer sends an indication to the apparatus after the lower layer enters the idle mode.

Example 11: The apparatus of at least one of the preceding examples, wherein the lower layer stops and releases a timer related to the inactive state.

Example 12: The apparatus of at least one of the preceding examples, wherein in response to the lower layer receiving the indication that the upper layer of the apparatus is in idle mode, the lower layer enters the idle mode and sends the indication to the apparatus after the lower layer enters the idle mode.

Example 13: The apparatus of at least one of the preceding examples, wherein the lower layer stops and releases a timer related to the inactive state.

Example 14: The apparatus of at least one of the preceding examples, wherein after the lower layer receives the request information asking the lower layer to enter RRC idle mode and responsive to the idle mode indication from the upper layer, the lower layer releases at least one of an access stratum context, a security context, or at least one inactive configuration, and wherein the lower layer enters the idle mode.

Example 15: The apparatus of at least one of the preceding examples, wherein the access stratum context comprises at least one of a current RRC configuration, a current security context, a packet data convergence protocol (PDCP) state (including Robust Header Compression (ROHC) state), a service data adaption protocol (SDAP) configuration, a cell-radio network temporary identification (C-RNTI) used in a source primary cell (PCell), an information element cellIdentity, or a physical cell identity of the source primary cell (PCell).

Example 16: The apparatus of at least one of the preceding examples, wherein the lower layer sends an indication to the apparatus after the lower layer enters the idle mode.

Example 17: The apparatus of at least one of the preceding examples, wherein the lower layer stops and releases a timer related to the inactive state.

Example 18: The apparatus of at least one of the preceding examples, wherein the lower layer receives the cell (re)selection request from the upper layer, the lower layer enters the idle mode.

Example 19: The apparatus of at least one of the preceding examples, wherein after the lower layer receives the cell (re)selection request from the upper layer, the lower layer releases at least one of an access stratum context, a security context, or at least one inactive configuration, and wherein the lower layer enters the idle mode.

Example 20: The apparatus of at least one of the preceding examples, wherein the access stratum context comprises at least one of a current RRC configuration, a current security context, a packet data convergence protocol (PDCP) state (including Robust Header Compression (ROHC) state), a service data adaption protocol (SDAP) configuration, a cell-radio network temporary identification (C-RNTI) used in a source primary cell (PCell), an information element cellIdentity, or a physical cell identity of the source PCell.

Example 21: The apparatus of at least one of the preceding examples, wherein the lower layer sends an indication to the apparatus after the lower layer enters the idle mode.

Example 22: The apparatus of at least one of the preceding examples, wherein the lower layer stops and releases a timer related to inactive state.

Example 23: The apparatus of at least one of the preceding examples, wherein determining if the second PLMN is an equivalent PLMN to the first PLMN comprises: the resource control module obtaining a list of equivalent PLMN to the first PLMN from the first cell, the resource control module storing the list of equivalent PLMN on computer-readable storage media, and the resource control module reviewing the stored list to determine if the second PLMN is an equivalent PLMN to the first PLMN.

Example 24: An apparatus comprising: a resource control module configured to: perform a cell-selection procedure that selects a first cell that serves a first PLMN; identify the first PLMN; establish a radio connection to the first PLMN; transition the apparatus from a connected state to an inactive state; identify a second PLMN; in response to identifying a second PLMN, perform a cell-reselection procedure that selects the second PLMN; determine that the second PLMN is an equivalent PLMN to the first PLMN; in response to determining that the second PLMN is an equivalent PLMN to the first PLMN, transition an upper layer of the apparatus to an idle mode (e.g., 5GMM-IDLE) and send an indication to a lower layer that triggers an action, wherein the indication comprises at least one of request information asking the lower layer to stay in active state, information indicating that the second PLMN is an equivalent PLMN to the first PLMN, information indicating that the apparatus is in an inactive mode at a radio resource control layer, and a cell (re) selection request.

Example 25: The apparatus of example 24, wherein determining if the second PLMN is an equivalent PLMN to the first PLMN comprises: the resource control module obtaining a list of equivalent PLMN to the first PLMN from the first cell, the resource control module storing the list of equivalent PLMN on computer-readable storage media, and the resource control module reviewing the stored list to determine if the second PLMN is an equivalent PLMN to the first PLMN.

Example 26: The apparatus of at least one of example 24 or 25, wherein after receiving the cell (re)selection request and finding the second PLMN is equivalent PLMN, the lower layer stays in the inactive mode.

Example 27: The apparatus of at least one of examples 24 to 26, wherein after receiving at least one of (a) request information asking lower layer to stay in active mode, (b) an indication that the second PLMN is equivalent PLMN to the first PLMN, or (c) an indication that the apparatus is in inactive mode at a radio resource control layer, the lower layer stays in the inactive mode.

Example 28: The apparatus of at least one of examples 24 to 27, wherein the resource control module determines that the second PLMN does not belong to (is not associated with) a Radio Access Network (RAN) notification area of the apparatus, and in response to that determination the lower layer performs a RAN notification area update procedure.

Example 29: An apparatus comprising: a resource control module configured to perform a cell-selection procedure that selects a first cell; and transition the apparatus from a connected state to an inactive state; wherein in response to receiving a Radio Resource Control (RRC) connection establishment request from an upper layer, perform an RRC connection establishment procedure.

Example 30: The apparatus of example 29, wherein the upper layer comprises a NAS layer or a 5GMM layer.

Example 31: The apparatus of at least one of examples 29 or 30, wherein the lower layer is an RRC layer.

Example 32: The apparatus of at least one of examples 29 to 31, wherein in response to the RRC connection establishment request the resource control module performs the RRC connection establishment procedure.

Example 33: The apparatus of at least one of examples 29 to 32, wherein responsive to the RRC connection establishment request the lower layer releases at least one of an access stratum context, a security context, or at least one inactive configuration, and wherein the lower layer enters the idle mode.

Example 34: The apparatus of at least one of examples 29 to 33, wherein the access stratum context comprises at least one of a current RRC configuration, a current security context, a packet data convergence protocol (PDCP) state (including Robust Header Compression (ROHC) state), a service data adaption protocol (SDAP) configuration, a cell-radio network temporary identification (C-RNTI) used in a source primary cell (PCell), an information element cellIdentity, or a physical cell identity of the source primary cell (PCell).

Example 35: The apparatus of at least one of examples 29 to 34, wherein the resource control module stops and releases a timer related to inactive state.

Example 36: The apparatus of at least one of examples 29 to 35, wherein the resource control module starts a T300 timer and sends an RRC setup request message to a network.

Example 37: The apparatus of at least one of examples 29 to 36, wherein the resource control module starts a T300 timer; wherein the resource control module sends an RRC setup request message to a network; and wherein the resource control module applies a default radio bearer configuration which includes at least one of physical channel configuration, semi-persistent scheduling configuration, medium access control (MAC) main configuration, or common control channel (CCCH) configuration.

Example 38: A method of handling Public Land Mobile Network selection by a user equipment, the method comprising: performing, by the user equipment, a cell-selection procedure that selects a first cell that serves a first Public Land Mobile Network; identifying, by the user equipment, the first Public Land Mobile Network; establishing, by the user equipment, a radio connection to the first Public Land Mobile Network where the user equipment enters a connected mode at a radio resource control (RRC) layer; transitioning, by the user equipment, from the connected mode at the RRC layer to an inactive mode at the RRC layer; identifying, by the user equipment, a second Public Land Mobile Network; responsive to identifying the second Public Land Mobile Network, performing, by the user equipment, a cell-reselection procedure that selects the second Public Land Mobile Network; determining that the second Public Land Mobile Network is not an equivalent Public Land Mobile Network to the first Public Land Mobile Network; and responsive to determining that the second Public Land Mobile Network is not an equivalent Public Land Mobile Network to the first Public Land Mobile Network, transitioning, by the user equipment, an upper layer of the user equipment to enter an idle mode (e.g., 5GMM-IDLE) and sending an indication to a lower layer of the user equipment that triggers an action, wherein the indication comprises at least one of: request information asking the lower layer to enter an RRC idle mode, information indicating that the second Public Land Mobile Network is not an equivalent Public Land Mobile Network to the first Public Land Mobile Network, information indicating that the upper layer is in the idle mode, or a cell (re)selection request directing the lower layer to perform a cell (re)selection procedure to select or (re)select a cell that belongs to the second Public Land Mobile Network.

Example 39: The method of example 38, further comprising at least one of: wherein the inactive mode is RRC_INACTIVE; wherein the upper layer idle mode is 5GMM-IDLE; or wherein the upper layer idle mode is NR-RRC IDLE.

Example 40: The method of at least one of examples 38 or 39, wherein the lower layer receives the request information asking the lower layer to enter RRC idle mode, and wherein responsive to receiving the request information, the method further comprises at least one of: releasing, by the lower layer, at least one of: an access stratum context, a security context, or at least one inactive configuration; or wherein responsive to receiving the request information, the method further comprises entering, by the lower layer, the idle mode.

Example 41: The method of at least one of examples 38 to 40 at least one of the preceding examples, wherein responsive to the lower layer receiving the information indicating that the second Public Land Mobile Network is not an equivalent Public Land Mobile Network to the first Public Land Mobile Network, the method further comprises at least one of: releasing, by the lower layer, at least one of: an access stratum context, a security context, or at least one inactive configuration; and entering, by the lower layer, the idle mode.

Example 42: The method of at least one of examples 38 to 41, wherein in response to the lower layer receiving the indication that the upper layer is in the idle mode, the method further comprises: entering, by the lower layer, the idle mode; and sending, by the lower layer, an indication to the upper layer after the lower layer enters the idle mode.

Example 43: The method of at least one of examples 38 to 42, wherein after the lower layer receives the request information asking the lower layer to enter RRC idle mode and responsive to the idle mode indication from the upper layer, the method further comprises at least one of: releasing, by the lower layer, at least one of: an access stratum context, a security context, or at least one inactive configuration, and entering, by the lower layer, the idle mode.

Example 44: The method of at least one of examples 38 to 43, further comprising: sending, by the lower layer, an indication to the user equipment after the lower layer enters the idle mode.

Example 45: The method of at least one of examples 38 to 44, further comprising at least one of sending, by the lower layer, an indication to the upper layer after the lower layer enters the idle mode; and stopping and releasing, by the lower layer, a timer related to inactive mode.

Example 46: The method of at least one of examples 38 to 45, wherein responsive to the lower layer receiving the cell (re)selection request from the upper layer, further comprising at least one of: releasing, by the lower layer, at least one of: an access stratum context, a security context, or at least one inactive configuration; or entering, by the lower layer, the idle mode.

Example 47: The method of at least one of examples 38 to 46, further comprising at least one of: sending, by the lower layer, an indication to the user equipment after the lower layer enters the idle mode; or stopping and releasing, by the lower layer, a timer related to inactive mode.

Example 48: The method of at least one of examples 38 to 47, wherein determining if the second Public Land Mobile Network is an equivalent Public Land Mobile Network to the first Public Land Mobile Network comprises: obtaining, by a resource control module implemented on the user equipment, a list of equivalent Public Land Mobile Network to the first Public Land Mobile Network from the first cell; storing, by the resource control module, the list of equivalent Public Land Mobile Network on computer-readable storage media; and reviewing, by the resource control module, the stored list to determine if the second Public Land Mobile Network is an equivalent Public Land Mobile Network to the first Public Land Mobile Network.

Example 49: The method of at least one of examples 38 to 48, further comprising at least one of: wherein the inactive mode is RRC_INACTIVE; wherein the upper layer idle mode is 5GMM-IDLE; or wherein the upper layer idle mode is NR-RRC IDLE.

Example 50: A user device comprising: a processor; and a computer-readable storage medium having stored thereon instructions that, responsive to execution by the processor, cause the processor to execute the method of any at least one of examples 38 to 49.

Example 51: A method of handling Public Land Mobile Network selection by a user equipment, the method comprising: performing, by the user equipment, a cell-selection procedure that selects a first cell that serves a first Public Land Mobile Network; identifying, by the user equipment, the first Public Land Mobile Network; establishing, by the user equipment, a radio connection to the first Public Land Mobile Network where the user equipment enters a connected mode at a radio resource control (RRC) layer; transitioning, by the user equipment, from the connected mode at an RRC layer to an inactive mode at an RRC layer; identifying, by the user equipment, a second Public Land Mobile Network; responsive to identifying the second Public Land Mobile Network, performing, by the user equipment, a cell-reselection procedure that selects the second Public Land Mobile Network; determining that the second Public Land Mobile Network is an equivalent Public Land Mobile Network to the first Public Land Mobile Network; and responsive to determining that the second Public Land Mobile Network is an equivalent Public Land Mobile Network to the first Public Land Mobile Network, transitioning an upper layer of the user equipment to an idle mode (e.g., 5GMM-IDLE) and sending an indication to a lower layer that triggers an action, wherein the indication comprises at least one of: request information asking the lower layer to stay in the connected mode, information indicating that the second Public Land Mobile Network is an equivalent Public Land Mobile Network to the first Public Land Mobile Network, information indicating that the user equipment is in an inactive mode at a radio resource control layer, or a cell (re)selection request directing the lower layer of the user equipment to perform a cell (re)selection procedure to select or (re)select a cell that belongs to the second Public Land Mobile Network.

Example 52: The method of example 51, wherein determining if the second Public Land Mobile Network is an equivalent Public Land Mobile Network to the first Public Land Mobile Network comprises at least one of: obtaining a list of equivalent Public Land Mobile Network to the first Public Land Mobile Network from the first cell; storing the list of equivalent Public Land Mobile Network on computer-readable storage media; or reviewing the stored list to determine if the second Public Land Mobile Network is an equivalent Public Land Mobile Network to the first Public Land Mobile Network.

Example 53: The method of at least one of examples 51 or 52, further comprising: wherein responsive to receiving the cell (re)selection request and finding the second Public Land Mobile Network is equivalent Public Land Mobile Network, the lower layer stays in the radio resource inactive mode.

Example 54: The method of at least one of examples 51 to 53, further comprising: wherein after receiving at least one of: (a) request information asking lower layer to stay in the connected mode, (b) an indication that the second Public Land Mobile Network is equivalent Public Land Mobile Network to the first Public Land Mobile Network, or (c) an indication that the user equipment is in the inactive mode at a radio resource control layer, the lower layer stays in the radio resource inactive mode.

Example 55: The method of at least one of examples 51 to 54, further comprising: determining, by the user equipment, that the second Public Land Mobile Network does not belong to a Radio Access Network notification area of the user equipment, and responsive to determining that the second Public Land Mobile Network does not belong to a Radio Access Network notification area of the user equipment, performing a Radio Access Network notification area update procedure.

Example 56: The method of at least one of examples 51 to 55, further comprising at least one of: wherein the radio resource inactive mode is RRC_INACTIVE; wherein the upper layer idle mode is 5GMM-IDLE; or wherein the upper layer idle mode is NR-RRC IDLE.

Example 57: A user device comprising: a processor; and a computer-readable storage medium having stored thereon instructions that, responsive to execution by the processor, cause the processor to execute the method of at least one of examples 51 to 56.

Example 58: A method of handling Public Land Mobile Network selection by a user equipment, the method comprising: performing, by the user equipment, a cell-selection procedure that selects a first cell that serves a first Public Land Mobile Network; identifying, by the user equipment, the first Public Land Mobile Network; establishing, by the user equipment, a radio connection to the first Public Land Mobile Network; transitioning, by the user equipment, from a connected mode at a radio resource control (RRC) layer to an inactive mode at a RRC layer; identifying, by the user equipment, a second Public Land Mobile Network; responsive to identifying the second Public Land Mobile Network, performing, by the user equipment, a cell-reselection procedure that selects the second Public Land Mobile Network; determining that the second Public Land Mobile Network is not an equivalent Public Land Mobile Network to the first Public Land Mobile Network; and responsive to determining that the second Public Land Mobile Network is not an equivalent Public Land Mobile Network to the first Public Land Mobile Network: transitioning, by the user equipment, an upper layer of the user equipment to enter an idle mode (e.g., 5GMM-IDLE); sending, by the upper layer, an RRC connection establishment request to a lower layer of the user equipment that triggers an action; receiving, by the lower layer, the RRC connection establishment request; and performing, by the lower layer, the RRC connection establishment.

Example 59: The method of example 58, further comprising wherein at least one of the upper layer comprises a NAS layer; the upper layer comprises a 5GMM layer; or the lower layer is an RRC layer.

Example 60: The method of at least one of examples 58 or 59, further comprising: responsive to receiving the RRC connection establishment request from the upper layer, releasing, by the lower layer, at least one of: an access stratum context, a security context, or at least one inactive configuration, and entering, by the lower layer, RRC idle mode.

Example 61: The method of at least one of examples 58 to 60, further comprising: wherein the access stratum context comprises at least one of: a current RRC configuration, a current security context, a packet data convergence protocol state (including Robust Header Compression state), a service data adaption protocol configuration, a cell-radio network temporary identification used in a source primary cell, an information element cellIdentity, or a physical cell identity of the source primary cell.

Example 62: The method of at least one of examples 58 to 61, further comprising at least one of stopping and releasing a timer related to inactive mode; or starting a T300 timer and sending an RRC setup request message to a network.

Example 63: The method of at least one of examples 58 to 62, further comprising at least one of starting a T300 timer; sending an RRC setup request message to a network; or applying a default radio bearer configuration, wherein the default radio bearer configuration comprises at least one of physical channel configuration, semi-persistent scheduling configuration, medium access control main configuration, or common control channel configuration.

Example 64: The method of at least one of examples 58 to 63, further comprising at least one of: wherein the radio resource inactive mode is RRC_INACTIVE; wherein the upper layer idle mode is 5GMM-IDLE; or wherein the upper layer idle mode is NR-RRC IDLE.

Example 65: A user device comprising: a processor; and a computer-readable storage medium having stored thereon instructions that, responsive to execution by the processor, cause the processor to execute the method of at least one of examples 58 to 64.

Example 66: A method of handling Public Land Mobile Network selection by user equipment, the method comprising: performing, by the user equipment, a cell-selection procedure that selects a first cell that serves a first Public Land Mobile Network; establishing, by the user equipment, a radio connection to the first Public Land Mobile Network where the user equipment enters a connected mode at a radio resource control layer; transitioning, by the user equipment, from the connected mode to an inactive mode at the radio resource control layer; identifying, by the user equipment, a second cell that serves a second Public Land Mobile Network; performing, by the user equipment, a cell-reselection procedure that selects the second cell that serves the second Public Land Mobile Network; determining that the second Public Land Mobile Network is not an equivalent Public Land Mobile Network to the first Public Land Mobile Network; and responsive to determining that the second Public Land Mobile Network is not an equivalent Public Land Mobile Network to the first Public Land Mobile Network: transitioning, by the user equipment, an upper layer of the user equipment to enter an idle mode, wherein the upper layer is a non-access stratum layer; and sending an indication to a lower layer of the user equipment that triggers an action, wherein the lower layer is in a radio resource inactive mode.

Example 67: The method of example 66, further comprising: receiving, at the lower layer, the indication, wherein the indication comprises at least one of: request information comprising a request to enter a radio resource control idle mode, information indicating that the second Public Land Mobile Network is not an equivalent Public Land Mobile Network to the first Public Land Mobile Network, information indicating that the upper layer is in the idle mode, a cell (re)selection request to perform a cell-reselection procedure, or a radio resource control connection establishment request.

Example 68: The method of at least one of examples 66 and 67, further comprising: receiving, by the lower layer, the radio resource control connection establishment request; and performing, by the lower layer, a radio resource control connection establishment procedure.

Example 69: The method of at least one of examples 66 to 68, further comprising: responsive to receiving the radio resource control connection establishment request from the upper layer, releasing, by the lower layer, at least one of: an access stratum context, a security context, or at least one inactive configuration.

Example 70: The method of at least one of examples 66 to 69, wherein responsive to the lower layer receiving the cell (re)selection request from the upper layer, the lower layer enters a radio resource control idle mode.

Example 71: The method of at least one of examples 66 to 70, further comprising: entering, by the lower layer, the radio resource control idle mode.

Example 72: The method of at least one of examples 66 to 71, further comprising: receiving, at the lower layer, the indication, wherein the indication comprises information indicating that the second Public Land Mobile Network is not an equivalent Public Land Mobile Network to the first Public Land Mobile Network, wherein responsive to the lower layer receiving the indication, the method further comprising at least one of: releasing, by the lower layer, at least one of: an access stratum context, a security context, or at least one inactive configuration; and entering, by the lower layer, the radio resource control idle mode.

Example 73: The method of at least one of examples 66 to 72, further comprising: receiving, at the lower layer, the indication, wherein the indication indicates that the upper layer is in an idle mode; responsive to receiving the indication that the upper layer is in the idle mode, the lower layer performs actions comprising at least one of: entering a radio resource control idle mode; or sending a reply indication to the upper layer indicating that the lower layer entered the radio resource control idle mode.

Example 74: The method of at least one of examples 66 to 73, further comprising: receiving, at the lower layer, the indication, wherein the indication comprises: the request information comprising a request to enter a radio resource control idle mode, and the information indicating that the upper layer is in an idle mode; and wherein, responsive to receiving the indication, the lower layer performs actions further comprising at least one of: releasing at least one of: an access stratum context, a security context, or at least one inactive configuration; or entering the radio resource control idle mode.

Example 75: The method of at least one of examples 66 to 74, further comprising at least one of: sending, by the lower layer, an idle mode indication to the upper layers after the lower layer enters the radio resource control idle mode; or stopping and releasing, by the lower layer, a timer related to the radio resource control inactive mode.

Example 76: The method of at least one of examples 66 to 75, wherein determining if the second Public Land Mobile Network is not an equivalent Public Land Mobile Network to the first Public Land Mobile Network comprises: obtaining from the first cell, by a resource control module implemented on the user equipment, a list of equivalent Public Land Mobile Networks to the first Public Land Mobile Network; storing, by the resource control module, the list of equivalent Public Land Mobile Network on computer-readable storage media; and reviewing, by the resource control module, the stored list to determine the second Public Land Mobile Network is not an equivalent Public Land Mobile Network to the first Public Land Mobile Network.

Example 77: The method of at least one of examples 66 to 76, wherein the access stratum context comprises at least one of: a current radio resource control configuration, a current security context, a packet data convergence protocol state, a packet data convergence protocol state including Robust Header Compression state, a service data adaption protocol configuration, a cell-radio network temporary identification used in a source primary cell, an information element cellIdentity, or a physical cell identity of the source primary cell.

Example 78: The method of at least one of examples 66 to 77, further comprising at least one of: stopping and releasing a timer related to the radio resource layer inactive mode; or starting a timer related to call setup and sending a radio resource control setup request message to a network.

Example 77: The method of at least one of examples 66 to 76, further comprising at least one of: starting a T300 timer; sending a radio resource control setup request message to a network; or applying a default radio bearer configuration, wherein the default radio bearer configuration comprises at least one of: physical channel configuration, semi-persistent scheduling configuration, medium access control main configuration, or common control channel configuration.

Example 78: The method of at least one of examples 66 to 77, further comprising: receiving, at the lower layer, the indication, wherein the indication comprises at least one of: request information comprising a request to stay in the radio resource connected mode, information indicating that the second Public Land Mobile Network is an equivalent Public Land Mobile Network to the first Public Land Mobile Network, information indicating that the user equipment is in the inactive mode at the radio resource control layer, or a cell (re)selection request to perform a cell (re)selection procedure, or a radio resource control connection establishment request.

Example 79: The method of at least one of examples 66 to 78, further comprising: responsive to receiving the radio resource control connection establishment request from the upper layer, releasing, by the lower layer, at least one of: an access stratum context, a security context, or at least one inactive configuration.

Example 80: The method of at least one of examples 66 to 79, further comprising: wherein responsive to receiving a cell (re)selection request and finding a third Public Land Mobile Network is an equivalent Public Land Mobile Network to the first Public Land Mobile Network, maintaining the radio resource control layer in the inactive mode.

Example 81: The method of at least one of examples 66 to 80, further comprising: wherein the lower layer stays in inactive mode after receiving the indication comprising at least one of: the request information, the information indicating that the second Public Land Mobile Network is equivalent Public Land Mobile Network to the first Public Land Mobile Network, or the information indicating that the user equipment is in the inactive mode at a radio resource control layer.

Example 82: The method of at least one of examples 66 to 81, further comprising: determining, by the user equipment, that the second Public Land Mobile Network is not associated with a Radio Access Network-based notification area of the user equipment, and responsive to determining that the second Public Land Mobile Network does not belong to a Radio Access Network-based notification area of the user equipment, performing a Radio Access Network-based notification area update procedure.

Example 83: The method of at least one of examples 66 to 82, further comprising at least one of: wherein the inactive mode at the radio resource control layer is RRC_INACTIVE; wherein the non-access stratum layer idle mode is 5GMM-IDLE; or wherein the non-access stratum layer idle mode is NR-RRC IDLE.

Example 84: The method of at least one of examples 66 to 83 comprising: a processor; and a computer-readable storage medium having stored thereon instructions that, responsive to execution by the processor, cause the processor to execute the method of any of the preceding examples 66 to 83.

CONCLUSION

Although techniques and devices for handling Public Land Mobile Network (PLMN) selection while a user equipment is in an inactive mode at a radio resource control layer have been described in language specific to features and/or methods, it is to be understood that the subject of the appended claims is not necessarily limited to the specific features or methods described. Rather, the specific features and methods are disclosed as example implementations of handling PLMN selection while user equipment is in an inactive mode at a radio resource control layer.

What is claimed is:

1. A method of handling Public Land Mobile Network selection by user equipment, the method comprising:
    performing, by the user equipment, a cell-selection procedure that selects a first cell that serves a first Public Land Mobile Network operated by a first carrier;
    establishing, by the user equipment, a radio connection to the first Public Land Mobile Network where the user equipment enters a connected mode at a radio resource control layer;
    transitioning, by the user equipment, from the connected mode to an inactive mode at the radio resource control layer;
    identifying, by the user equipment, a second cell that serves a second Public Land Mobile Network operated by a second carrier;
    performing, by the user equipment, a cell-reselection procedure that selects the second cell that serves the second Public Land Mobile Network;
    determining that the second Public Land Mobile Network is not an equivalent Public Land Mobile Network, to which the user equipment can register, on a list of equivalent Public Land Mobile Networks to the first Public Land Mobile Network; and
    responsive to determining that the second Public Land Mobile Network is not an equivalent Public Land Mobile Network to the first Public Land Mobile Network:
        transitioning, by the user equipment, a non-access stratum layer of the user equipment to enter an idle mode; and
        sending an indication to the radio resource control layer of the user equipment that triggers an action.

2. The method of claim 1, further comprising:
    receiving, at the radio resource control layer, the indication, wherein the indication comprises at least one of:
        request information comprising a request to enter a radio resource control idle mode,
        information indicating that the second Public Land Mobile Network is not an equivalent Public Land Mobile Network to the first Public Land Mobile Network,
        information indicating that the non-access stratum layer is in the idle mode, a cell (re)selection request to perform a cell-reselection procedure, or a radio resource control connection establishment request.

3. The method of claim 2, further comprising:

receiving, by the radio resource control layer, the radio resource control connection establishment request; and performing, by the radio resource control layer, a radio resource control connection establishment procedure.

4. The method of claim 1, wherein the indication is received from the non-access stratum layer, the method further comprising:

responsive to receiving the indication from the non-access stratum layer, releasing, by the radio resource control layer, at least one of:

an access stratum context, a security context, or at least one inactive configuration.

5. The method of at claim 1, further comprising:

entering, by the radio resource control layer, a radio resource control idle mode.

6. The method of claim 5, further comprising at least one of:

sending, by the radio resource control layer, an idle mode indication to the non-access stratum layer after the radio resource control layer enters the radio resource control idle mode; or stopping and releasing, by the radio resource control layer, a timer related to the radio resource control inactive mode.

7. The method of claim 1, wherein determining if the second Public Land Mobile Network is not an equivalent Public Land Mobile Network to the first Public Land Mobile Network comprises:

obtaining from the first cell, by a resource control module implemented on the user equipment, a list of equivalent Public Land Mobile Networks to the first Public Land Mobile Network;

storing, by the resource control module, the list of equivalent Public Land Mobile Network on computer-readable storage media; and reviewing, by the resource control module, the stored list to determine the second Public Land Mobile Network is not an equivalent Public Land Mobile Network to the first Public Land Mobile Network.

8. The method of claim 1, wherein the indication is received from the non-access stratum layer, the method further comprising:

responsive to receiving the indication, releasing, by the radio resource control layer, an access stratum context, wherein the access stratum context comprises at least one of:

a current radio resource control configuration, a current security context, a packet data convergence protocol state, a packet data convergence protocol state including Robust Header Compression state, a service data adaption protocol configuration, a cell-radio network temporary identification used in a source primary cell, an information element cellIdentity, or a physical cell identity of the source primary cell.

9. The method of claim 1, further comprising at least one of:

stopping and releasing a timer related to the radio resource control layer inactive mode; or starting a timer related to call setup and sending a radio resource control setup request message to a network.

10. The method of claim 1, further comprising at least one of:

starting a T300 timer;

sending a radio resource control setup request message to a network; or applying a default radio bearer configuration, wherein the default radio bearer configuration comprises at least one of:

physical channel configuration, semi-persistent scheduling configuration, medium access control main configuration, or common control channel configuration.

11. The method of claim 1, further comprising:

receiving, at the radio resource control layer, the indication, wherein the indication comprises at least one of:

information indicating that the second Public Land Mobile Network is an equivalent Public Land Mobile Network to the first Public Land Mobile Network, information indicating that the user equipment is in the inactive mode at the radio resource control layer, a cell (re)selection request to perform a cell (re)selection procedure, or a radio resource control connection establishment request.

12. The method of claim 1, further comprising:

receiving, at the radio resource control layer, the indication, wherein the indication comprises a cell (re)selection request to perform a cell (re)selection procedure, and wherein responsive to receiving a cell (re)selection request and finding a third Public Land Mobile Network is an equivalent Public Land Mobile Network to the first Public Land Mobile Network, maintaining the radio resource control layer in the inactive mode.

13. The method of claim 11, further comprising:

wherein the radio resource control layer stays in inactive mode after receiving the indication comprising at least one of:

the information indicating that the second Public Land Mobile Network is equivalent Public Land Mobile Network to the first Public Land Mobile Network, or the information indicating that the user equipment is in the inactive mode at the radio resource control layer.

14. The method of claim 11, further comprising:

determining, by the user equipment, that the second Public Land Mobile Network is not associated with a Radio Access Network-based notification area of the user equipment, and responsive to determining that the second Public Land Mobile Network does not belong to a Radio Access Network-based notification area of the user equipment, performing a Radio Access Network-based notification area update procedure.

15. The method of claim 1, further comprising at least one of:

wherein the inactive mode at the radio resource control layer is RRC_INACTIVE; or wherein the non-access stratum layer idle mode is 5GMM-IDLE.

16. A user equipment comprising:
a processor; and
a computer-readable storage medium having stored thereon instructions that, responsive to execution by the processor, cause the processor to execute operations comprising:
- perform a cell-selection procedure that selects a first cell that serves a first Public Land Mobile Network operated by a first carrier;
- establish a radio connection to the first Public Land Mobile Network where the user equipment enters a connected mode at a radio resource control layer;
- transition from the connected mode to an inactive mode at the radio resource control layer;
- identify a second cell that serves a second Public Land Mobile Network operated by a second carrier;
- perform a cell-reselection procedure that selects the second cell that serves the second Public Land Mobile Network;
- determine that the second Public Land Mobile Network is not an equivalent Public Land Mobile Network, to which the user equipment can register, on a list of equivalent Public Land Mobile Networks to the first Public Land Mobile Network; and
- responsive to a determination that the second Public Land Mobile Network is not an equivalent Public Land Mobile Network to the first Public Land Mobile Network:
  - transition a non-access stratum layer of the user equipment to enter an idle mode; and
  - send an indication to the radio resource control layer of the user equipment that triggers an action.

17. The user equipment of claim 16, wherein the instructions cause the processor to execute operations further comprising:
receive, at the radio resource control layer, the indication, wherein the indication comprises at least one of:
- request information comprising a request to enter a radio resource control idle mode,
- information indicating that the second Public Land Mobile Network is not an equivalent Public Land Mobile Network to the first Public Land Mobile Network,
- information indicating that the non-access stratum layer is in the idle mode,
- a cell (re)selection request to perform a cell-reselection procedure, or
- a radio resource control connection establishment request.

18. The user equipment of claim 16,
wherein the indication is received from the non-access stratum layer, and
wherein the instructions cause the processor to execute operations further comprising:
responsive to receiving the indication, release, by the radio resource control layer, an access stratum context,
wherein the access stratum context comprises at least one of:
- a current radio resource control configuration,
- a current security context,
- a packet data convergence protocol state,
- a packet data convergence protocol state including Robust Header Compression state,
- a service data adaption protocol configuration,
- a cell-radio network temporary identification used in a source primary cell,
- an information element cellIdentity, or
- a physical cell identity of the source primary cell.

19. The user equipment of claim 16, wherein the instructions cause the processor to execute operations further comprising:
receive, at the radio resource control layer, the indication, wherein the indication comprises a cell (re)selection request to perform a cell (re)selection procedure, and
wherein responsive to receiving the cell (re)selection request and finding a third Public Land Mobile Network is an equivalent Public Land Mobile Network to the first Public Land Mobile Network, maintain the radio resource control layer in the inactive mode.

20. The user equipment of claim 16, further comprising at least one of:
the inactive mode at the radio resource control layer is RRC_INACTIVE; or
the non-access stratum layer idle mode is 5GMM-IDLE.

* * * * *